(12) United States Patent
Demianchik et al.

(10) Patent No.: US 11,051,239 B2
(45) Date of Patent: Jun. 29, 2021

(54) MULTIPLE AIR INTERFACE AGGREGATION SUPPORTING MULTIVENDOR 4G/5G NETWORKS

(71) Applicant: Nokia Solutions and Networks Oy, Espoo (FI)

(72) Inventors: Dmitry Demianchik, St. Petersburg (RU); Kamakshi Sridhar, Plano, TX (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/628,155

(22) PCT Filed: Jul. 7, 2017

(86) PCT No.: PCT/RU2017/000499
§ 371 (c)(1),
(2) Date: Jan. 2, 2020

(87) PCT Pub. No.: WO2019/009753
PCT Pub. Date: Jan. 10, 2019

(65) Prior Publication Data
US 2020/0163004 A1    May 21, 2020

(51) Int. Cl.
*H04W 72/00* (2009.01)
*H04W 48/16* (2009.01)
(Continued)

(52) U.S. Cl.
CPC ......... *H04W 48/16* (2013.01); *H04L 61/2007* (2013.01); *H04L 61/2592* (2013.01);
(Continued)

(58) Field of Classification Search
CPC ....... H04W 76/12; H04W 88/16; H04W 8/26; H04W 12/0602; H04W 84/045;
(Continued)

(56) References Cited

U.S. PATENT DOCUMENTS

| | | | |
|---|---|---|---|
| 8,010,085 B2 * | 8/2011 | Apte | H04L 63/102 455/410 |
| 9,924,413 B2 * | 3/2018 | Adjakple | H04W 12/068 |

(Continued)

FOREIGN PATENT DOCUMENTS

WO    WO 2016/144224 A1    9/2016

*Primary Examiner* — Joseph Arevalo
(74) *Attorney, Agent, or Firm* — Harrington & Smith

(57) ABSTRACT

At a network element, a first TEID is determined that is associated with a default bearer between a UE and a first APN. A determination is made whether a tunnel discovery procedure should be performed to discover a second TEID associated with a dummy bearer. The dummy bearer is associated with the UE and a second APN. The tunnel discovery procedure is performed to discover the second TEID, and the dummy bearer is set up between the network element and the UE. Data arriving at the network element from the core network and toward the UE is routed over one of the default bearer, using the first TEID, or the dummy bearer, using the second TEID. Data arriving at the network element from the UE and toward the core network is routed over only over the default bearer. Apparatus, methods, and computer programs and products are disclosed.

21 Claims, 6 Drawing Sheets

(51) Int. Cl.
*H04L 29/12* (2006.01)
*H04W 16/32* (2009.01)
*H04W 28/02* (2009.01)
*H04W 40/02* (2009.01)
*H04W 92/20* (2009.01)

(52) U.S. Cl.
CPC ....... *H04W 16/32* (2013.01); *H04W 28/0252* (2013.01); *H04W 40/02* (2013.01); *H04W 92/20* (2013.01)

(58) Field of Classification Search
CPC ............. H04W 24/04; H04W 36/0022; H04W 36/165; H04W 36/305; H04W 36/36; H04W 40/24; H04W 40/248; H04W 76/11; H04W 76/16; H04W 76/18; H04W 76/19; H04W 80/10; H04W 8/08; H04W 8/082; H04W 24/02; H04W 28/08; H04W 36/0033; H04W 36/0066; H04W 36/14; H04W 40/02; H04W 48/16; H04W 76/15; H04W 76/25; H04W 84/02; H04W 88/182; H04W 8/12; H04W 92/02; H04W 92/24; H04W 12/0608; H04W 12/08; H04W 16/32; H04W 24/08; H04W 28/0252; H04W 36/0011; H04W 36/08; H04W 36/125; H04W 36/22; H04W 36/32; H04W 40/00; H04W 40/34; H04W 52/28; H04W 52/282; H04W 52/283; H04W 64/00; H04W 64/003; H04W 64/006; H04W 76/10; H04W 76/22; H04W 80/04; H04W 84/005; H04W 88/06; H04W 88/08; H04W 88/10; H04W 8/00; H04W 8/186; H04W 92/20
USPC ................................. 455/450, 411, 436, 507
See application file for complete search history.

(56) References Cited

U.S. PATENT DOCUMENTS

| | | | | |
|---|---|---|---|---|
| 10,334,557 | B2* | 6/2019 | Zhao | H04W 8/08 |
| 2007/0091862 | A1* | 4/2007 | Ioannidis | H04W 8/12 370/338 |
| 2010/0325714 | A1* | 12/2010 | Iyer | H04W 12/062 726/8 |
| 2011/0090815 | A1* | 4/2011 | Gundavelli | H04L 12/4633 370/253 |
| 2012/0046058 | A1* | 2/2012 | Vesterinen | H04W 8/082 455/509 |
| 2012/0164979 | A1* | 6/2012 | Bachmann | H04W 12/062 455/411 |
| 2013/0089076 | A1* | 4/2013 | Olvera-Hernandez | H04W 36/08 370/332 |
| 2015/0201453 | A1* | 7/2015 | Roeland | H04W 76/16 370/328 |
| 2015/0312383 | A1 | 10/2015 | Roeland et al. | |
| 2017/0048074 | A1 | 2/2017 | Roeland | |
| 2018/0048558 | A1* | 2/2018 | Lake | H04L 45/745 |
| 2018/0213587 | A1* | 7/2018 | Kim | H04W 40/24 |

* cited by examiner

MULTIPLE AIR INTERFACE AGGREGATION SUPPORTING MULTIVENDOR 4G/5G NETWORKS

CROSS REFERENCE TO RELATED APPLICATION

This patent application is a U.S. National Stage application of International Patent Application Number PCT/RU2017/000499 filed Jul. 7, 2017, which is hereby incorporated by reference in its entirety.

TECHNICAL FIELD

This invention relates generally to wireless, cellular networks and, more specifically, relates to aggregation over air interfaces in cellular networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

A typical wireless cellular network uses large cells commonly called macro cells. These cells are general large and created by high power. In crowed areas or areas needing coverage at certain areas, the macro cells may use small cells to increase capacity. These small cells go by a variety of names, such as macro-, micro-, pico- and femto-cells (from largest, most powerful to smallest and least powerful). The term "metro cell" may also be used, as these small cells are useful in a metropolitan situation with a need for higher capacity. The coverage area of the macro cells is larger than the cover area of the metro cells, and the coverage area of the metro cells typically underlies (that is, is within) the coverage area of the macro cells. The combination of macro and metro cells in the same network may be referred to as a heterogeneous network (HetNet).

One issue with HetNets is that macro and metro cells may be operated by two different vendors (also called operators herein). For instance, it is possible to introduce metro cells into 4G/5G macro markets as a metro cell overlay solution. Currently, however, this is difficult unless the vendor for the macro cell (formed by a base station typically referred to as an eNB for 4G or a gNB for 5G) cooperates and coordinates with the metro cells, e.g., in optimizing overall system capacity. There is little incentive for a vendor of a macro cell to maximize the overall system capacity at the expense of decreasing macro capacity. That is, the metro cell uses the same frequency carriers as the macro cell, so the task is to decide which UEs are served with the macro cell and which ones are served with the metro cell. Offloading UEs to the metro cell means that fewer UEs are served by the macro cell, thereby decreasing macro capacity. From an operator's perspective, this can reduce market share of the macro cell and therefore is not desirable if the operator does not control both the macro and metro cells.

BRIEF SUMMARY

This section is intended to include examples and is not intended to be limiting.

In an example of an embodiment, a method is disclosed that comprises: determining, at a network element that provides an interface in a wireless network between base stations and a core network, a first tunnel endpoint identifier associated with a default bearer between a user equipment and a first access point name; determining, at the network element, whether a tunnel discovery procedure should be performed to discover a second tunnel endpoint identifier associated with a dummy bearer, the dummy bearer associated with the user equipment and a second access point name, wherein the default and dummy bearers are different; performing, at the network element and in response to a determination the tunnel discovery procedure should be performed, the tunnel discovery procedure to discover the second tunnel endpoint identifier associated with the dummy bearer; setting up, at the network element, the dummy bearer between the network element and the user equipment; routing, by the network element, data arriving at the network element from the core network and toward the user equipment over one of the default bearer, using the first tunnel endpoint identifier, or the dummy bearer, using the second tunnel endpoint identifier; and routing, by the network element, data arriving at the network element from the user equipment and toward the core network over only over the default bearer.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform at least the following: determining, at a network element that provides an interface in a wireless network between base stations and a core network, a first tunnel endpoint identifier associated with a default bearer between a user equipment and a first access point name; determining, at the network element, whether a tunnel discovery procedure should be performed to discover a second tunnel endpoint identifier associated with a dummy bearer, the dummy bearer associated with the user equipment and a second access point name, wherein the default and dummy bearers are different; performing, at the network element and in response to a determination the tunnel discovery procedure should be performed, the tunnel discovery procedure to discover the second tunnel endpoint identifier associated with the dummy bearer; setting up, at the network element, the dummy bearer between the network element and the user equipment; routing, by the network element, data arriving at the network element from the core network and toward the user equipment over one of the default bearer, using the first tunnel endpoint identifier, or the dummy bearer, using the second tunnel endpoint identifier; and routing, by the network element, data arriving at the network element from the user equipment and toward the core network over only over the default bearer.

An example of a computer program product includes a computer-readable storage medium bearing computer program code embodied therein for use with a computer. The computer program code includes: code for determining, at a network element that provides an interface in a wireless network between base stations and a core network, a first tunnel endpoint identifier associated with a default bearer between a user equipment and a first access point name; code for determining, at the network element, whether a tunnel discovery procedure should be performed to discover a second tunnel endpoint identifier associated with a dummy bearer, the dummy bearer associated with the user equipment and a second access point name, wherein the default and dummy bearers are different; code for performing, at the network element and in response to a determination the tunnel discovery procedure should be performed, the tunnel discovery procedure to discover the second tunnel endpoint identifier associated with the dummy bearer; code for setting up, at the network element, the dummy bearer between the network element and the user equipment; code for routing, by the network element, data arriving at the network element from the core network and toward the user equipment over one of the default bearer, using the first tunnel endpoint identifier, or the dummy bearer, using the second tunnel endpoint identifier; and code for routing, by the network element, data arriving at the network element from the user equipment and toward the core network over only over the default bearer.

In another example of an embodiment, an apparatus comprises: means for determining, at a network element that provides an interface in a wireless network between base stations and a core network, a first tunnel endpoint identifier associated with a default bearer between a user equipment and a first access point name; means for determining, at the network element, whether a tunnel discovery procedure should be performed to discover a second tunnel endpoint identifier associated with a dummy bearer, the dummy bearer associated with the user equipment and a second access point name, wherein the default and dummy bearers are different; means for performing, at the network element and in response to a determination the tunnel discovery procedure should be performed, the tunnel discovery procedure to discover the second tunnel endpoint identifier associated with the dummy bearer; means for setting up, at the network element, the dummy bearer between the network element and the user equipment; means for routing, by the network element, data arriving at the network element from the core network and toward the user equipment over one of the default bearer, using the first tunnel endpoint identifier, or the dummy bearer, using the second tunnel endpoint identifier; and means for routing, by the network element, data arriving at the network element from the user equipment and toward the core network over only over the default bearer.

DETAILED DESCRIPTION OF THE DRAWINGS

Figure 1:
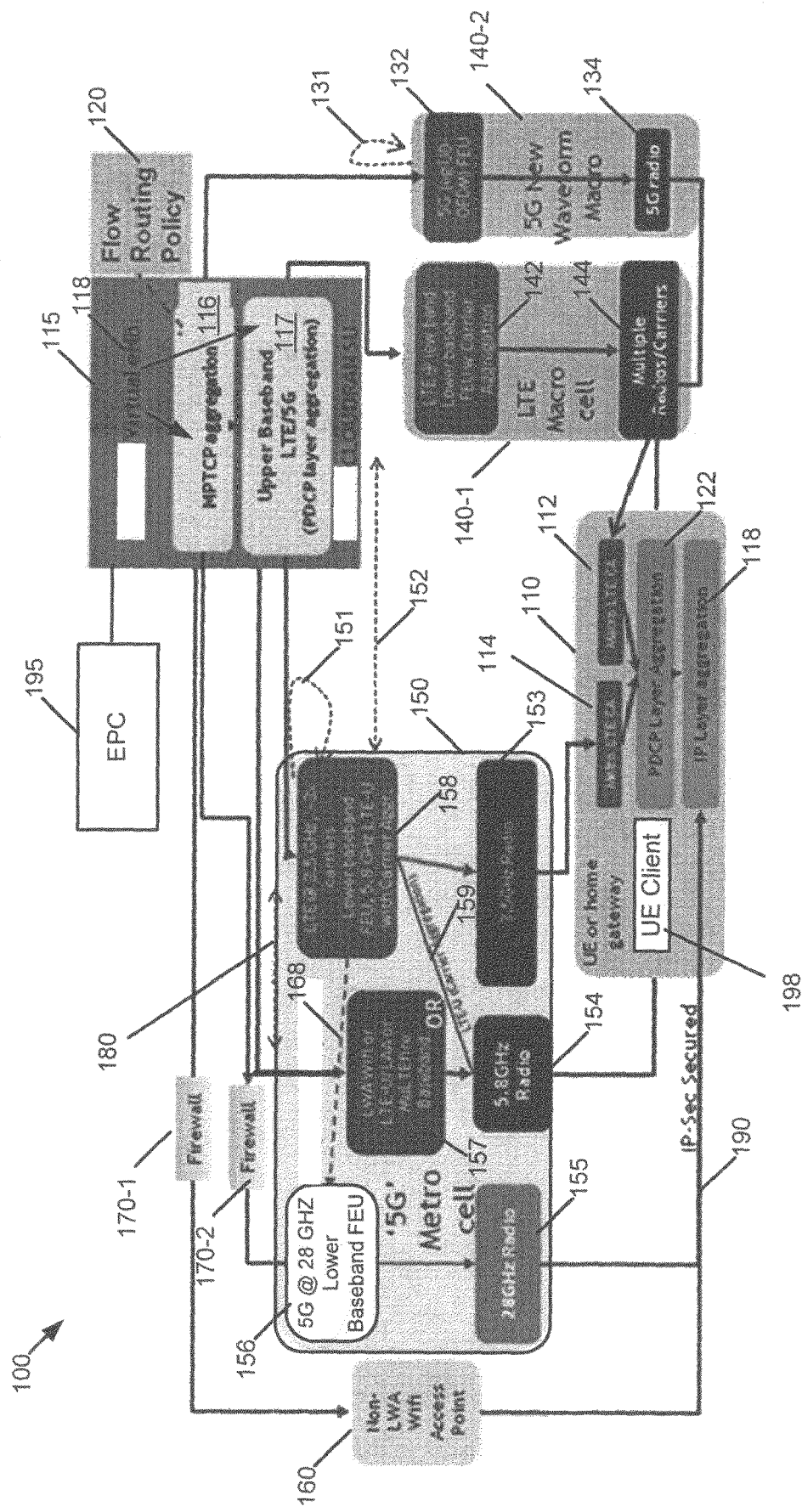
FIG. 1 is a block diagram of one possible and non-limiting exemplary system in which the exemplary embodiments may be practiced.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

It is noted that there are acronyms herein that may use uppercase letters and lowercase letters. For instance, ip1 (an IP address, e.g., for a UE) may also be referred to as IP1. The same could be said for Teid and TEID. This difference between uppercase and lowercase letters should not be interpreted as an actual difference between the two versions.

As stated above, it is currently difficult to introduce metro cells from one vendor into 4G/5G macro markets operated by a second vendor as a metro cell overlay solution. Unless the competitor macro cell (eNB) cooperates and coordinates with the metro cells in optimizing overall system capacity, the resultant overall system capacity will be less than it could be. There is no incentive for a vendor controlling a macro cell to maximize the overall system capacity at the expense of decreasing macro capacity. The exemplary embodiments herein realize the benefits of maximal HetNet capacity with a metro cell overlay solution with no assistance from the macro eNB.

To maximize the overall combined macro and metro cell capacity where the macro and metro cells are operated by two different vendors, there are two options, described below. Neither of these options allows integration of macro and metro cells at a beneficial overall system capacity, unless there is support from the vendor of the macro eNB, which is typically not in their interest. Existing options are as follows.

The first option is Dual Connectivity (DC-3C), which supports HetNet operation in a multivendor environment (i.e., macro and metro cells from different vendors). While this is described in standards, in reality there is very little incentive for the macro vendors to cooperate with the metro vendors in maximizing the overall system capacity at the expense of the macro capacity. The control logic for managing the HetNet capacity resides in the macro eNB, which may not favor metro capacity to be maximally utilized. In many cases, macro vendors may not support DC-3C because they would be forced to support other metro vendors in their markets.

The second option is Dual Connectivity (DC-1A), which does not support peak aggregate throughputs across both macro and metro cells. It only allows some flows to be diverted to the macro cell and other flows to be diverted to the metro cells. It does not allow for packets from a single flow to be spread across a macro cell and one or more metro cells. The decision on which flow is steered toward what bearer is made by the EPC, based on static PCC rules. More specifically, the EPC makes decisions using PCC (Policy &

Charging Control) rules, configured at the PGW (Packet Gateway) or dynamically set by the AF (Application Function). This decision-making process does not allow dynamic flow re-binding to the bearer with better conditions or split the flow between bearers. Multi-bearer models with sophisticated PCC rules are not popular with operators due to their complexity.

Multipath TCP can be used to aggregate across multiple air interfaces that belong to the same eNB, and/or include WiFi or other non-cellular interfaces. However, multipath TCP does not allow aggregation across cellular interfaces (e.g., LTE) that belong to different cells. The issue here is that the tunnels to deliver flows to a UE over MCG (Master Cell Group) and SCG (Secondary Cell Group) bearers are not known to the MPTCP proxy operating on the RAN edge (above the PDCP layer). The RAN edge means that some functional entity operates at a point where traffic goes to the cluster of one or several macro cells and several metro cells. This functional entity (called the MPTCP proxy herein) intercepts traffic sent to the cluster and decides how to manage the traffic. The PDCP layer means functional entity (e.g., Traffic Steering) that acts on the IP layer, which is independent of mobile network specifics. For example, MPTCP at this level does not take into account LTE specifics; instead, it makes decisions based on TCP flow control algorithms. Another issue is that operators typically use a single APN model with a single IP address assigned to a UE, while the MPTCP client on the UE should have two IP addresses to properly map TCP sub-flows to each of the two IP addresses. An Access Point Name (APN) is a gateway between a mobile network and another computer network, frequently the Internet. In particular, an APN is associated with the properties of the distinct PDN (packet data network) connection, provided by PGW (packet data gateway) to the same or various packet networks. Each APN is associated with a pool of ip-addresses, which the UE will be assigned from, policies and charging rules, and the like.

No effective solutions exist today for optimizing overall system (e.g., HetNet) capacity that allow a metro cell vendor to overlay a macro eNB and control the joint optimization of the overall system capacity. Where an operator is the incumbent macro vendor, the operator can introduce their metro cells in their macro environment and make this work effectively. However, the opposite is not true: an operator introducing metro cells to overlay a macro cell of an incumbent and different vendor currently will not be able to optimize overall system capacity. That is, the intent of LTE technology assumes all traffic decisions are made by the macro cell. In particular, when Dual Connectivity 3C is used, the macro cell (MeNB) is responsible to decide how to split traffic between the macro and metro cells. From an RRM point of view, if the macro and metro cells are from two different vendors, there is little or no incentive for the operator of the macro cell to optimize system capacity by transferring UEs to metro cells, as this means the operator would potentially have less market share and/or income. An RRM task decides which UE will be served by which eNB. From a traffic steering view, the task is how many traffic links to direct over distinct radio legs toward the UE connected to the macro cell and in a simultaneous manner. With respect to macro overlay, the task (for a micro cell vendor) is how many traffic links to send over both the macro and micro cells with benefit to the micro cell vendor for the cases when the UE is connected to both the macro and micro cells. So, it is not an offloading decision, made on the RRM level, but a steering decision made on the IP-layer, independent of DC algorithms implemented in the macro cell.

In an exemplary embodiment, one goal is to introduce metro cells from one vendor into macro markets controlled by other vendors, as a metro cell overlay solution. The exemplary embodiments herein aim to realize the benefits of maximal HetNet capacity with a metro overlay solution with no assistance from the macro eNB.

This may be achieved in a network such as where the following are supported:

1) Dual Connectivity (e.g., DC-1A) is supported so that a UE is reachable via radio interfaces from two different cells (e.g., a macro cell and a metro cell); and 2) Multipath TCP (MPTCP) is introduced as an aggregation layer across macro cells and metro cells (and optionally WiFi access points).

Specifically, a metro-overlay system with an MPTCP-based (e.g., in accordance with RFC 6824 published by the IETF) aggregation solution may be used as shown in FIG. 1. This figure is a block diagram of one possible and non-limiting exemplary system 100 in which the exemplary embodiments may be practiced. The MPTCP aggregation layer 116 may aggregate across macro cells 140 (of which macro cells 140-1 and 140-2 are shown), metro cells (of which one 5G metro cell 150 is shown) and standalone WiFi hotspots (e.g., access point 160), including 5G New Radio (NR) interfaces (see 5G new waveform macro cell 140-2). The MPTCP aggregation layer 116 allows all bands to be aggregated and utilized effectively, driven by, e.g., a flow routing policy engine 120. Additionally, the MPTCP aggregation layer 116 is assumed to take IP traffic from the EPC 198 (e.g., over the S1-U interface).

In FIG. 1, the UE 110 (or other similar devices such as a home gateway 110) communicates with the 5G metro cell 150 and typically one of the LTE macro cell 140-1 or the 5G new waveform macro cell 140-2. As is known, a home gateway for a RAN plays a similar role as UE in a cellular system. Instead of the UE, which consumes traffic delivered by RAN itself, a home gateway instead routes traffic delivered by the RAN toward home devices such as TV and the like. For ease of reference, reference 110 will be called a UE, and the term "user equipment" is intended to encompass a home gateway or other element that can benefit from the multiple air interface aggregation techniques as described herein. The UE 110 communicates with one of the LTE macro cell 140-1 or the 5G macro cell 140-2 using carrier aggregation (CA), as indicated by macro LTE CA 112. The UE 110 communicates with the 5G metro cell via CA, as indicated by the metro LTE CA 114. Both of these go through PDCP layer aggregation 122 and to IP layer aggregation 118. The UE 110 may also communicate with the non-LWA WiFi access point (AP) 160. Both the AP 160 and 5G metro cell 150 may communicate with the UE 110 using the IP-sec secured link 190. The UE client 198 is an IP layer entity at the UE 110 that will access two APNs (shown in, e.g., FIG. 4).

The 5G metro cell 150 comprises the following in this example: a 5G at (@) 28 GHz lower baseband FEU 156 and a corresponding 28 GHZ radio 155; an LWA Wi-Fi or LET-U/LAA or MuLTEfire baseband 157 and a corresponding 5.8 GHz radio 154; an LTE @3.5 GHz ~3x carriers lower baseband FEU, 5.8 GHz LTE-U with carrier aggr. (aggregation) 157 that is connectable to both the 5.8 GHz radio 154 and the 3.5 GHz radio 153. Reference 151 indicates LTE-U used for carrier aggregation. Reference 158 indicates a feedback link from low band for 28 GHz control (i.e., beam selection). Reference 159 indicates a link for LTE-U (e.g., carrier aggregation). Reference 180 indicates a possible link for LWA.

The LTE macro cell 140-1 comprises an LTE at (@) low band lower baseband FEU with (w/) carrier aggregation 142 and multiple radios/carriers 144. The 5G macro cell 140-2 comprises a 5G FEU 132 and a 5G radio. Reference 131 for the 5G macro cell 140-2 indicates carrier aggregation.

A CloudRAN SU 115 is also illustrated, and this can communicate with the AP 160 through firewall 170-1 and with the 5G metro cell 150 through the firewall 170-2. The CloudRAN SU 115 may also communicate with the LTE macro cell 140-1 and the 5G macro cell 140-2. The CloudRAN SU 115 comprises an MPTCP aggregation layer 116 and an upper baseband LTE/5G (PDCP layer aggregation) layer 117, and the layers 116 and 117 may be formed as part of a virtual eNB 118. The CloudRAN SU 115 may implement a flow routing policy engine 120, e.g., as part of the MPTCP aggregation layer 116. The CloudRAN SU 115 is an edge entity in an example, which operates at a point where traffic goes to the cluster of cells 140 and 150. The MPTCP aggregation layer 116 and its functionality may also be referred to as an MPTCP proxy, which runs on an edge entity, in this case the CloudRAN SU 115. Depending on terminology, the CloudRAN SU 115 may also be referred to as MPTCP proxy. The edge entity runs on the edge of the cluster of cells 140, 150 and intercepts S1-U interface (e.g., GTP) traffic and needs to associate peers of a TCP session and corresponding S1-U tunnels (TEID). The entity that performs the MPTCP aggregation is not limited to a CloudRAN SU and may be other suitable entities. In the figures that follow, this entity is described as an MPTCP proxy. The CloudRAN SU communicates with the EPC 195, as described in more detail below.

Before proceeding with additional description of the exemplary embodiments, it is helpful to review some terminology used herein. The description indicates that "cells" perform functions, but it should be clear that the eNB (or gNB) that forms the cell will perform the functions. The cell makes up part of an eNB. That is, there can be multiple cells per eNB. For instance, there could be three cells for a single eNB carrier frequency and associated bandwidth, each cell covering one-third of a 360 degree area so that the single eNB's coverage area covers an approximate oval or circle. Furthermore, each cell can correspond to a single carrier and an eNB may use multiple carriers. So, if there are three 120 degree cells per carrier and two carriers, then the eNB has a total of six cells. Also, macro cells 140 will also be referred to as MeNBs 140 or macro eNBs 140, and metro cells 150 will also be referred to as SeNBs 150 or metro eNBs 150.

As for the exemplary embodiments, these describe techniques to introduce metro cells from one vendor into macro networks controlled by another vendor. With these techniques, the MPTCP aggregation layer 116 (or other MPTCP proxy) is able open two TCP subflows (one over the MeNB, one over the SeNB) to the same UE IP address (IP-addr). The MPTCP is able to detect the tunnel ID TEIDs, without any assistance from the MeNB 150, thus allowing a metro overlay solution to be realized with peak aggregate throughputs across macros and metros with no assistance from, or coordination with, the macro eNB 150.

In particular, peak HetNet capacity may be delivered in a metro overlay solution, with traffic and radio resource management under control of the metro vendor in a macro network controlled by another vendor. The peak HetNet capacity may be characterized by peak aggregate throughputs that use the capacity of macro cells and metro cells simultaneously for a single flow.

The following is a broad overview of operations (a), (b), and (c) that may be performed to provide multiple air interface aggregation supporting multivendor 4G/5G networks. The combination of a TEID discovery mechanism at an MPTCP layer (see operation (c) below) with operations (a) and (b) and dual connectivity (e.g., DC-1A) results in a unique solution that delivers peak aggregate throughputs with a metro overlay network 100. These exemplary operations are as follows.

(a) Different UE IP-addresses are allocated per leg to allow the client to distinguish between the legs. This is accomplished by the UE connecting to two APNs, so that the MPTCP proxy can open up two subflows: one subflow towards macro cell 140; and one subflow towards a metro cell 150. Both subflows reach the same UE 110. Each radio bearer associated with these subflows has a different TEID.

(b) Dummy bearers are defined to allocate tunnels that are used by the MPTCP proxy and not used by the core network. This allows the MPTCP proxy to make a split of two legs with no conflict with EPC logic.

(c) A TEID discovery procedure along with associated signaling (which does not require standardization) is introduced to assign a flow IP-addr to be assigned to a tunnel. The MPTCP proxy at the network should know the individual TEIDs associated with the bearers going over the MeNB 140 and the SeNB 150 in order to be able to split traffic arriving over a single eRAB (APN1). MPTCP needs to detect TEID change when bearer (APN2) is moved toward the SeNB. The unique TEID discovery mechanism at the MPTCP, without any information provided by the MeNB 140, allows for the exemplary embodiments to deliver the described benefits.

The techniques herein combine the operation and benefits of MPTCP with, e.g., DC-1A to deliver peak aggregate throughputs that would be achieved with a DC-3C-like solution, yet no support is needed from the macro network in allocation of radio resources and thus maximization of overall network capacity. As previously described, a technique used herein involves obtaining two IP addresses for the UE. A bearer is assigned to each IP address. In the case where two bearers associated with two ip-addr (IP1, IP2) are created, and the DC-1A feature is supported, DC-1A logic at the MeNB 140 would move bearers between eNBs (e.g., from the MeNB 140 to the SeNB 150). In this case, the TEIDs of the bearers are changed, but IP addresses are not affected. The UE client 198 does not see if bearer was moved because the client still sees IP1,IP2 (IP addresses assigned and corresponding to the UE), independent of the fact that the bearer that carried IP2 was moved between eNBs. The tunnel id (TEID) associated with each bearer changes as the tunnel moves between MeNB and SeNB, and the specific TEID must be made visible to the MPTCP proxy. The algorithm below addresses all aspects of the above principles needed to make this work. For ease of reference, the rest of this disclosure is separated into different sections.

Exemplary Algorithm

Figure 2:
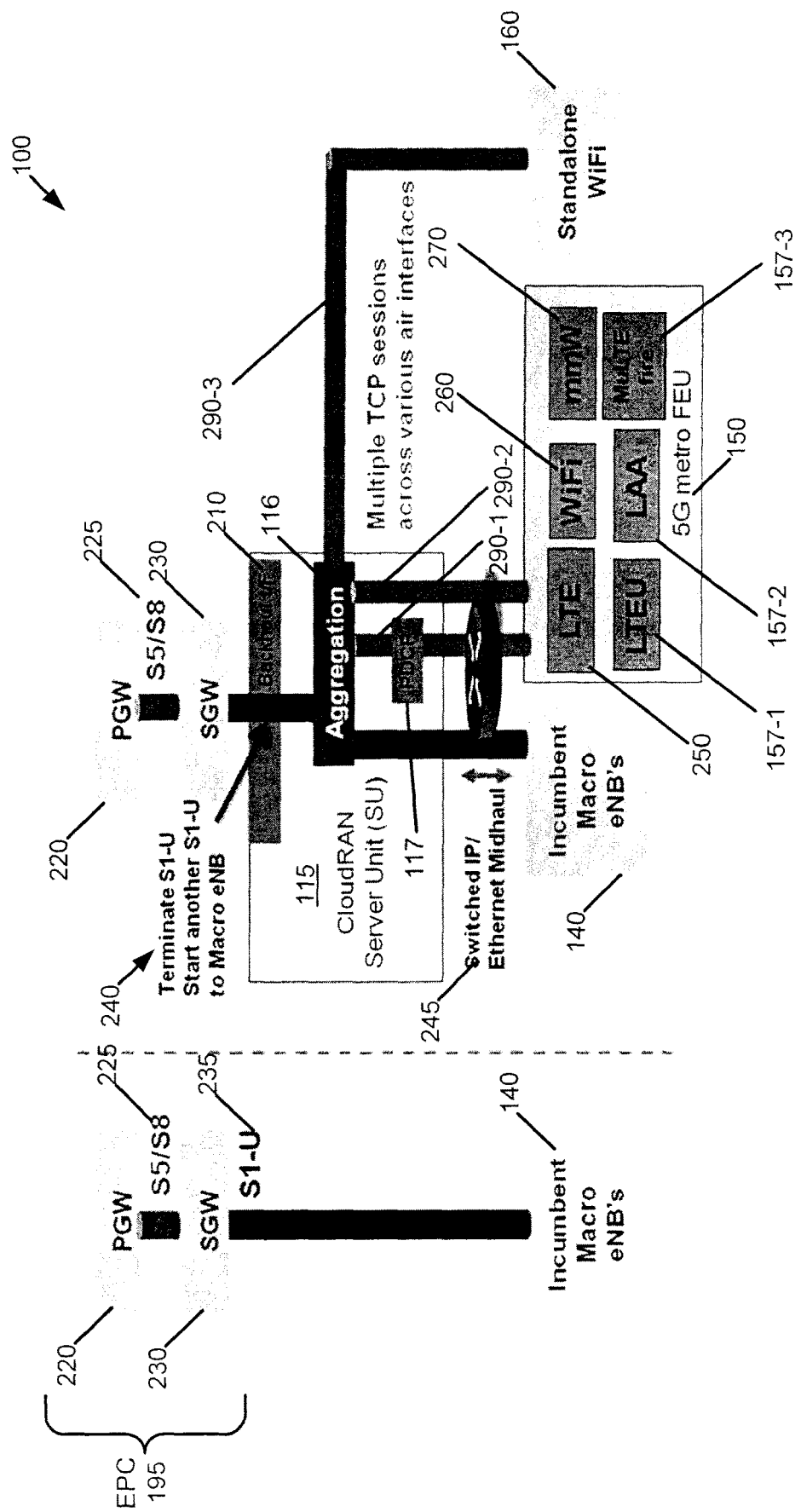
FIG. 2 illustrates a metro overlay implemented in the network of FIG. 1 with MPTCP-based aggregation, in accordance with an exemplary embodiment.
Figure 3:
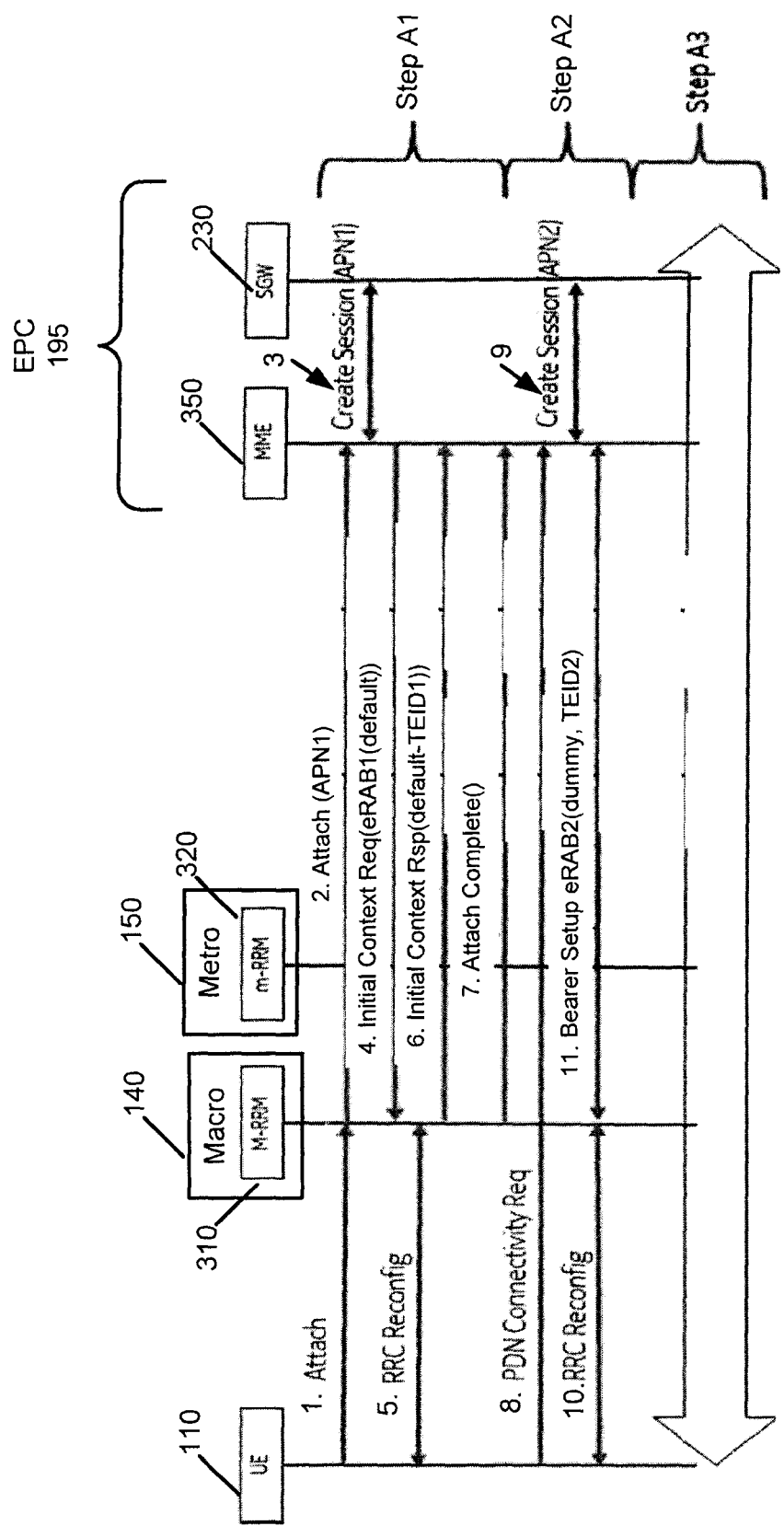
FIG. 3 is a signaling diagram illustrating assignment of two different IP addresses per UE, in accordance with an exemplary embodiment.
Figure 4:
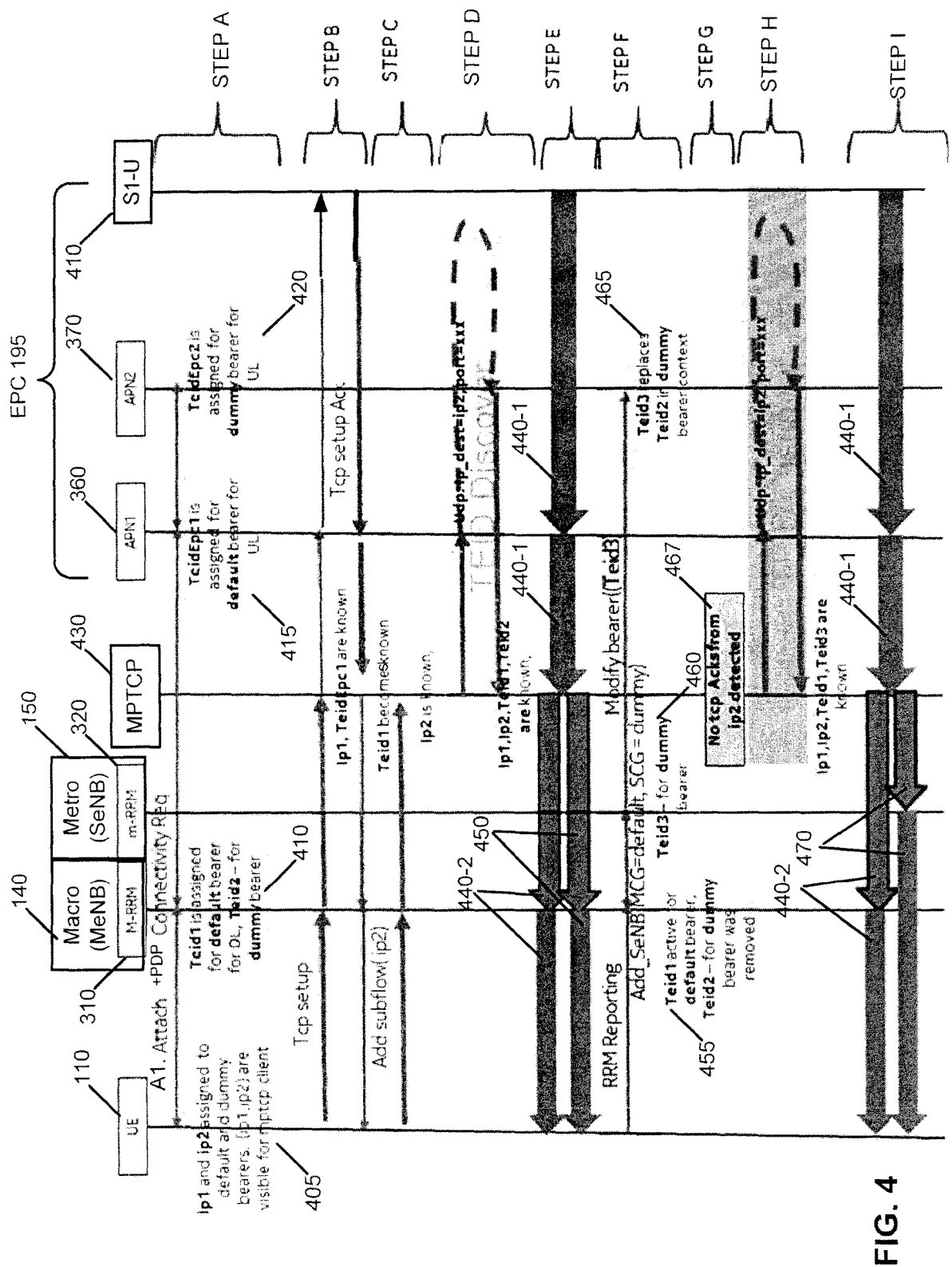
FIG. 4 is a signaling diagram for call flow for macro overlay with no MeNB assistance, in accordance with an exemplary embodiment.

Multiple figures are used to illustrate one exemplary algorithm used to implement multiple air interface aggregation supporting multivendor 4G/5G networks. FIG. 2 shows a pictorial representation of a metro overlay implemented in a network with MPTCP-based aggregation, with the aggregation layer supported on the CloudRAN server unit (SU), which acts as an MPTCP proxy. The aggregation layer may also reside outside the CloudRAN (e.g., a Mobile Edge Computing, MEC, platform). FIG. 3 is a signaling diagram illustrating assignment of two different IP addresses per UE. The associated text for FIG. 3 describes an exemplary IP assignment mechanism. FIG. 4 and the text associated with this figure illustrate an exemplary call flow for the metro overlay operation. The algorithm describes operation of a macro overlay with DC-1A and MPTCP to achieve peak aggregate throughputs for a single flow.

In FIG. 2, a metro overlay is implemented in the network 100 of FIG. 1 with MPTCP-based aggregation. FIG. 2 illustrates another view of the network 100 of FIG. 1. In this example, the packet gateway (PGW) 220 and serving gateway (230) are shown (as part of the EPC 195), as are the interfaces that interconnect these and the incumbent macro eNBs 140. The S1-U is an interface used to interconnect the SGW 230 and the macro eNBs 140, and the S5/S8 interfaces are used to interconnect the SGW 230 and the PGW 220. The left-hand side illustrates a simple view of these connections and without macro overlay, while the right-hand side illustrates a more complex view of these connections, complete with multiple devices that use these interfaces via macro overlay.

On the right-hand side, the CloudRAN SU 115 connects to the SGW 230 using the backhaul interface (I/F) 210, which terminates the S1-U interface from the SGW 230 and starts another S1-U interface toward the macro eNB 140. See reference 240. The MPTCP aggregation layer 116 of the CloudRan SU 115 aggregates multiple TCP sessions 290-1, 290-2, and 290-3 between the 5G metro FEU 150 and the standalone WiFi AP 160. The TCP session 290-1 also passes through the PDCP aggregation layer 117. The MPTCP aggregation layer 116 also aggregates information from the macro eNBs 140. The aggregation occurs through the switched IP/Ethernet midhaul 245. The MPTCP aggregation layer 116 operates in the IP layer. The MPTCP aggregation layer 116 intercepts S1-U (GTP) traffic, decapsulates the GTP traffic, performs MPTCP actions and encapsulates IP packets to GTP to deliver to an eNB where the PDCP layer is running.

The 5G metro cell 150 includes in this example the LTE-U baseband 157-1, an LAA baseband 157-2 and an MuLTEfire baseband 157-3, an LTE 250, a WiFi 260, and an mmW 270. These are different RATs (radio access technologies) that can be used in a metro cell. These are merely exemplary and fewer, more, or different RATs may be used.

Background Regarding Assigning Two IP Addresses to a UE 110

Connection by a UE to two APNs is a standard feature and the connection works the same way independent of if DC-1A feature is present or not. This is a legacy way for operators provide services specific to the operators to users. For example, for a VoLTE service, a separate APN may be used that assigns an IP-addr from an IMS sub-net to the UE and assigns an IP address that is routable in the Internet to all other traffic. In this case, a GBR QCI1 bearer is used for RTP traffic between the IMS and the UE (e.g., using IP1) and a default QCI5 is used for all other traffic between the UE (e.g., using IP2) and the Internet. Another example is video services, where there is a separate APN which assigns a UE IP-addr from a video server sub-net, while all other traffic is from the Internet, where the UE is visible with another IP-addr.

Assigning Two IP Addresses to the UE

Exemplary steps for assigning two IP addresses to the UE are illustrated in FIG. 3. FIG. 3 is a signaling diagram illustrating assignment of two different IP addresses per UE 110, in accordance with an exemplary embodiment. FIG. 3 illustrates the control plane procedures Attach and PDP connectivity, and this figure illustrates how IP addresses are assigned. In this example, UE 110, M-RRM 310 (as part of a macro cell 140), m-RRM 320 (as part of the metro cell 150), MME 350, and SGW 230 are shown. The M-RRM is the radio resource management (RRM) in a macro cell 140. The m-RRM 310 is the RRM in the 5G metro cell 150.

The reason for the two APNs is that the operator defines an additional APN (APN2) besides a default APN (APN1) to support a macro overlay feature. Each APN is configured with their own range of IP addresses to be assigned to the UE when the UE performs a PDP connection Request. The APNs are illustrated in FIG. 4.

In Step A1, at the initial attach (see step 1), the UE connects to APN1, and is assigned with IP1 (an IP address) in this PDN connection. After an attach, a single default bearer (e.g., eRAB1 (TEID1)) is created to transfer packets to the IP address IP1. More completely, Step A1 includes steps 1-7. In step 1, there is an initial Attach message from the UE 110 to the APN1. There is an Attach (APN1) message in step 2 that is sent from the M-RRM 310 to the MME 350. The MMM 350 communicates with the SGW 230 via at least a Create Session (APN1) message in step 3. In step 4, the MME 350 responds to the APN1 350 with an Initial Context Request (Req) message with an (eRAB1(default)) indication. In step 5, RRC Reconfiguration (Reconfig) messaging occurs between the UE 110 and the APN1 360. In step 6, the M-RRM 310 sends an Initial Context Response (Rsp) with an (eRAB1(default-TEID1)) to the MME 350. Every bearer created at Attach time is identified with a TEID. The TEID is sent with a GTP packet directed to the eNB to be passed to the UE. The TEID allows the eNB to associate the packet with UE context and to manage the packet properly. In step 7, the M-RRM sends an Attach Complete ( ) message to the MME 350. Note that this sequence of steps also allows the MME 350 and the APN1 360 to have a first tunnel endpoint identifier (TEID1).

Then UE 110 initiates connectivity to another APN=APN2 in Step A2. To do that, the UE 110 should issue a PDN_Connectivity Request (Req). That is, to make the UE connect to another APN and to be assigned with second IP-addr, a PDP Connectivity request is used by UE (instead of attach) The PDP Connectivity Request message is initiated on UE by the MPTCP client 198 or would be done manually by the user. At this point, a dedicated (dummy) bearer (eRAB (TEID2)) is created and associated with another UE IP2 address. The sequence of steps in Step A2 includes steps 8-11. In step 8, the UE 110 issues a PDN Connectivity Request (Req) message to the MME 350. Create Session (APN2) messaging occurs in step 9 between the MME 350 and the SGW 230. Another RRC Reconfiguration (Reconfig) messaging occurs in step 10, which is where the UE is assigned the IP2 address. In step 11, Bearer Setup eRAB2 communication occurs with the indication (dummy, TEID2). The APN1 360 and the MME 350 also have another TIED, TEID2 assigned to the UE 110.

In Step A3, other communications occur between these elements.

Note that the IP addresses assigned the UE are used by other elements in the system to connect to and contact the UE. These two IP addresses are used below for two bearers, with each IP address associated with a bearer.

Establishing Dummy Bearers

FIG. 4 is used to illustrate, among other things, establishing dummy bearers. FIG. 4 illustrates control and user planes. Major steps taken are as follows: Step A involves IP assignment; Step E involves traffic flow over single AP; Steps F-H involve the UE moving into the control plane of the metro cell; and Step 1 involves traffic split between the macro and metro user planes. Until step F, both bearers go through the macro eNB and are served at the M-RRM. At step F, the UE moves into micro coverage and the "dummy"

bearer is moved to the micro cell. From this point, the macro cell supports one bearer toward the UE and the micro cell supports one bearer. The MPTCP proxy 430 decides how to split traffic between the bearers and address packets to the macro cell and to the micro cell. The MPTCP proxy 430 includes the MPTCP aggregation layer 116 and may also include other functionality. For instance, the MPTCP proxy 430 may be a complete traffic steering engine. Such traffic steering may be represented as more complex entity, where the traffic steering may be a part of a HetNet scheduler engine, which is responsible for leg connectivities and traffic steering on various layers. The HetNet scheduler engine can include the following: HN-LM—link management to maintain radio legs toward UE connectivity; TE-SW1—Traffic Switching—Traffic steering engine that operates on an IP layer; and TR_Sp1—Traffic Splitting—Traffic Steering engine that operates on the PDCP layer. In this example, it is assumed that the MPTCP proxy 430 has at least traffic switching capabilities. The CloudRAN SU 115 is one possible way to implement the MPTCP proxy 430.

An operator model defines "dummy" bearers, which are used to support, e.g., DC-1A logic at the UE and the eNBs. At the initial attach, and as previously described, the UE is provided with two bearers: the default and dedicated (dummy) bearers. The EPC 195 always directs traffic over the single default bearer. At the EPC 195, the TFT will not select any flow to bind to the "dummy" bearer so EPC 195 sends no packets toward the "dummy" bearer. As is known, the TFT assigns a traffic filter (for example, source=IPAddress) and the PGW directs packets that match the filter to corresponding bearer (via a GTP tunnel).

The UE attaches to MeNB (APN1 360) and two bearers are created by connecting to two different APNs (APN1 360 and APN2 370). Connectivity to two APNs means that the UE 110 is connected to two different networks and is reachable in every network with a unique IP address (IP-addr) assigned to the UE for each network. Use of additional APN in scheme DC-1A allows having different IP addresses for bearer1 (ip1) and bearer2 (ip2). As stated previously, bearer 2 on APN2 is configured in a way that the EPC does not send traffic over this bearer (which is why it is called a "dummy bearer").

Much of this is indicated in STEP A, where in step A1, attach and PDP Connectivity Request (Req) procedures are performed. Specifically, the UE performs the attach to APN1 and is assigned with the default bearer. The UE performs PDN Connectivity_Req (a connectivity request) to APN2 and is assigned the dummy bearer. In block 410, the IP addresses IP1 and IP2 are assigned to default and dummy bearers, respectively. Both the {IP1, IP2} are visible for the MPTCP client in the UE 110. See block 405. In block 410, TEID1 is assigned for the default bearer (bearer1) for DL, and TEID2 is assigned for the dummy bearer (bearer2) for DL. The M-RRM 310 hosts both TEID1 (IP1) and TEID2 (IP2). Block 415 indicates that TEIDEPC1 is assigned to the default bearer for UL. Block 420 indicates that TEIDEPC2 is assigned to the dummy bearer for UL. The APN1 360 hosts TEIDEPC1, and the APN2 370 hosts the TEIDEPC2. Note that the right side of the diagram is considered to be other parts of the EPC 195, illustrated here as being the S1-U interface 410.

After STEP A, tunnels for both bearers are terminated at the same eNB (MeNB 140), and GTP packets have the same destination=ip-addr-MeNB, but different TEIDs.

In STEP B, at TCP setup time, the MPTCP proxy (e.g., MPTCP aggregation layer 116) learns the TEIDEPC1 from UL packet IP1 and takes TEID1 from TCP setup ACK (acknowledge).

In STEP C, the UE is assigned IP2 and issues add_sub-flow(IP2). IP2 is known at this point to the MPTCP proxy (e.g., MPTCP aggregation layer 116).

STEP B is triggered when the UE 110 is going to set up any TCP session with a network application. At this point, MPTCP procedures are used, as follows: setup and add_sub-flow (STEPS B and C) are performed. These procedures are supported by MPTCP proxy 430 at the RAN edge. MPTCP proxy 430 works with inner GTP packets (e.g., packets sent by the UE to its application) and initially does not know which eNB ip-addr and GTP TEID correspond to which inner packet ip-addr. From procedure messages, the MPTCP proxy determines information about IP1, IP2 of the same UE and that TEIDs for IP1.

In STEP D, the MPTCP proxy 430 starts a tunnel discovery procedure for IP2 to determine the TEID2 of the dummy bearer. The MPTCP proxy 430 is stand-alone function which is not privy to any information over LTE control plane procedures. Instead, the MPTCP proxy 430 intercepts user plane interface and creates needed UE associations using some OTT (over the top) procedures. The ip1-ip2 correspondence to the same UE and ip1 to eNB1 and TEID1 (and the default bearer), and ip2 to eNB2 and TEID2 (and the dummy bearer) should be discovered by MPTCP, using TCP triggers and discovery procedures. For example, the MPTCP proxy 430 sends a special UDP packet on the UL default bearer (TEIDEPC1) with a destination IP address of IP2 (dest_ip=IP2) and with a unique port (unique port=xxx). This port is the only port configured for DL on the dummy bearer. The port is configured by means of setting a static PCC rule for this APN. When APN is set up at the PGW (e.g., at system configuration time), all APN parameters are configured, including ip-pool addresses, PCC rules to classify and charge traffic, and the like. The packet is routed on the Gi interface from APN1 to APN2 and arrives back to the MPTCP proxy 430 over a dummy tunnel. At this point, MPTCP proxy 430 knows TEID2 (and, as indicated, IP1, IP2, and TEID 1).

In more detail, all data related to UE transport is typically a tuple, such as the following: {IP1, TEID1, IP2, TEID2}. Note that the former tuple is used to simplify tuple representation. Specifically, the tunnel to send a message to the UE is a combination of eNB-ip+bearer TEID. A more complete set of attributes to be maintained for such a tunnel is a 6-tuple: {ue_ip1, eNB_ip1, TEID1; ue_ip2, eNB_ip2, TEID2}. To send message to Ue_ip1, we need to send a packet to eNB_ip1. A user packet to send should be encapsulated to GTP with TEID set in the GTP header.

To make TEID2 known, the MPTCP proxy 430 sends a packet to IP2 through network (STEP D). The packet is routed the following way: MPTCP proxy 430 toward APN1 360 toward the data network (Internet, e.g., through the S1-U 410) toward the APN2 370 toward the MPTCP proxy 430. When the packet is returned to the MPTCP proxy, the inner packet is encapsulated to GTP with TEID2 in the header and with SeNB ip-addr as the destination address. So, the MPTCP proxy 430 would complete the tuple creation, as the MPTCP proxy 430 now knows TEID2. At this point, the MPTCP proxy knows all transport attributes and knows that both tunnels are terminated at the same eNB. It is up to the MPTCP proxy 430 if a single TCP sub-flow or two subflows should be used (as there may be no benefit on using two subflows over the same eNB).

Packets Arriving for an Incoming Flow

At the UE side, at the IP layer (e.g., at the UE client 198 and/or the IP layer aggregation 118) there will be two IP addresses, IP1 and IP2, which are assigned to the UE 110. The former one is associated with Bearer1 and the latter one with Bearer2. At the initial time, both bearers (tunnels) go through the M-eNB 140 and have the corresponding TEIDs of TEID1 and TEID2. With regard to bearers and tunnels, a bearer is a concept. In other words, a bearer is associated with a set of parameters, including QoS to treat packets to be transported. A tunnel—typically using GTP (General Tunnel Protocol)—is a means to transfer packets that have the same QoS treatment. At the session establishment time, UE Context is created and maintained at the eNB and PGW. For every bearer for that UE, bearer context is created and associated with UE context. Bearer context includes one or more of the following: classification rules (rules to associate arrived packets to distinct bearer), QoS parameters, and tunnel parameters. Tunnel parameters may include the following: eNB ip_addr; and TEID. The eNB ip_addr—is the IP address of the eNB that serves UE at a given time. The TEID is a unique identifier, assigned by the eNB, to make the eNB associate packets arrived over a tunnel with UE context and bearer context. In other words, when a packet arrives, the eNB will have to serve the packet at the air based on the rules kept at the UE-bearer context. Tunnel protocol (GTP) is used to transfer inner user packets, where the "inner" user packets are encapsulated into GTP: an inner packet is extended with a GTP header (with TEID) and sent to dest-addr=eNB_ip-addr.

The MPTCP proxy 430 receives DL TCP packets from the EPC 195 over Bearer1 440-1 and would decide to split it to two sub-flows directed toward Bearer1 440-2 and Bearer2 450.

The MPTCP proxy 430, e.g., with Intelligent Traffic Control (ITC), uses two sub-TCP legs to go to known TEIDs toward the macro cell 140 and the micro cell 150. In addition, the MPTCP proxy 430 may use an optional third leg (WiFi) of traffic and split traffic between 3GPP and non-3GPP legs. In this disclosure, we do not describe the MPTCP operation with WiFi.

The policy used by the MPTCP proxy 430 to split TCP over LTE legs would conflict with EPC policies regarding which bearer is used for which services. To avoid this conflict, a "dummy" bearer is defined, with no traffic mapped to the dummy bearer on EPC side. Thus, two tunnels (e.g., over Bearers 1 440-2 and 450) are created to deliver traffic to the UE 110, but one tunnel only is used by the EPC to deliver DL UE traffic to the RAN. So, the service-to-leg binding decision is made by a single entity, the MPTCP proxy 430.

In more detail, for STEP E, traffic from the Bearer1 440-1 is split by the MPTCP proxy 430 toward two tunnels and goes through the MeNB (the macro cell 140) as both tunnels are still at the MeNB 140. STEP E indicates that the tunnel 440-2 (corresponding to the default bearer, Bearer1) and tunnel 450 (corresponding to the dummy bearer, Bearer 2) are both routed to the McNB 140 from the MPTCP proxy 430. Traffic always goes over the default bearer 440 in relation to the core network, as policies of second bearer 450 do not select any flow in the core network.

A short review is beneficial before proceeding with description of other steps. As indicated above, ip2 is the IP address assigned to UE when the UE performed the PDP-_Connection toward APN2. See STEP C. The ip1 and ip2 are the two IP addresses assigned to UE, and inside the UE, these addresses are relayed to two IP interfaces. When an MPTCP capable UE client initiates a TCP session toward a network application (tcp_setup) as in STEP B, the MPTCP Proxy intercepts this TCP session and organizes three TCP sessions instead: (1) UE_ip1 to and from the MPTCP Proxy; (2) UE_ip2 to and from the MPTCP Proxy; and MPTCP Proxy to and from networkApp_ip over APN1 toward network. UE client application 198 is unaware about these multiple sessions and "thinks" there is a single client-to-network-application session.

Packets from the network application to the client application 198 are sent toward MPTCP proxy assigned ip-addr. This session is terminated at the MPTCP proxy (see STEP E). The MPTCP proxy 430 sends packets received through APN1 to the UE over one of the two tcp_sub-flow (sub-sessions): MPTCP→ip1 (440-1) or MPTCP→ip2 (450). The MPTCP proxy 430 decides what subflow on which the packet should be sent based on TCP flow control, which controls each subflow. So, if a tcp-window on subflow1 indicates more packets ACKed then window of subflow2, MPTCP sends the packet over subflow1, and vice versa. In the case of a packet sent over subflow2 (ip2) has not been responded to in a distinct time, this will trigger the MPTCP proxy 430 check if ip2 is still accessible and also to try to re-discover the tunnel to which ip2 packets now are being relayed. The latter is described immediately below.

Discovery of TEIDs by the MPTCP Proxy without Assistance from the MeNB

At STEP E, standard DC procedures move one of the bearers to the SeNB 150, so tunnel attributes are changed as follows: a new eNB (MeNB) ip-addr and new TEID3 are used. The MPTCP proxy 430 is not notified by RAN about these changes, and the MPTCP proxy 430 has to use its natural mechanism to discover these changes: after bearer was moved, no TCP ACKs are sent by old eNB. As no ACKs were detected (STEP G, block 467), the MPTCP proxy 430 repeats TEID discovery to re-create UE transport tuple with new SeNB ip-addr and new TEID3. The procedure also is run in the case of SeNB handover.

As tuple is created, the MPTCP proxy 430 knows which tunnel to use to send packets on sub-flow1 (IP1) and which for IP2. The MPTCP proxy would use a flow control mechanism to steer traffic over legs as well some extra policies would be used to make the MPTCP proxy 430 decide which TCP packet is to be sent over which sub-flow. This allows for implementing various policies within the MPTCP proxy 430 regarding traffic distribution between the macro and micro cells.

To split traffic across the TCP subflows, MPTCP should know the TEIDs associated with the individual bearers (one default bearer, and one dedicated bearer). The default bearer always passes through the MeNB and maintains the same TEID1. The dedicated bearer, when passing through the MeNB has a TEID2, and when the dedicated bearer is moved to the SeNB acquires a new TEID namely TEID3.

When a TCP-connect arrives at the MPTCP proxy 430, say over TEID1, the MPTCP proxy 430 should know if Bearer2 exists and know its TEID2, to make any decision. It should run a TEID discovery procedure (see STEP D) every time an add/delete TCP-subflow operation is triggered and/or every time a TEID for a distinct leg is changed due to bearer move to/from SeNB. Details of the TEID discovery are described in STEP D of FIG. 4 and also text above with respect to STEP D. STEP H is another TEID discovery procedure.

The UE reports good cells via the RRM Reporting in STEP F. This reporting indicates the appearance of the SeNB 150. This means it is possible for the UE to also receive information from the SeNB 150. As the UE moves to the area with both MeNB 140 and SeNB 150 coverage, MeNB (RRM) (DC-1A mechanism) moves Bearer2 (IP2) to SeNB. Specifically, the MeNB RRM moves the "dummy" bearer to SeNB (using standard X2App procedures).

This is illustrated by STEP F, where the DC-1A (by M-RRM in MeNB 140) moves the dummy bearer to m-RRM 320. A standard DC procedure is used in STEP F, as basically a relatively simple set of messages. However, the procedure is more complex, as follows.

1) The UE had measured the metro cell 150 and reports to M-RRC via RRM reporting.

2) The macro cell 140 issues an RRC command to the UE to join the metro cell 150.

3) The macro RRC (M-RRC) communicates to the metro RRC (m-RRC) to decide what work the m-RRC would take (i.e., the M-RRC sends Add-SeNB message to m-RRC, with the MGC=default and SCG=dummy variables).

4) The SeNB 150 decided based on available resources how the SeNB can help the MeNB. Two options are available: "split DC-3C" and "move DC-1A". The SeNB 150 is in this example configured to choose DC-1A. The DC-1A creates a new TEID within SeNB and responds to MeNB with Add-SeNB-response (with the new TEID passed via this message).

5) The MeNB communicates to the MME with a "modify bearer" message including the new TEID assigned by the SeNB. The MME communication continues toward PGW (APN2).

6) PGW (APN2) changes bearer context as follows: {new eNB ip=SeNB ip; new TEID=SeNB assigned TEID}.

7) From this point, all packets that match Bearer2 condition will be transferred to SeNB-ip, TEID by PGW.

After this process, the TEID2 on the M-RRM 310 stops working, and the TEID3 assigned to m-RRM is a termination for the dummy bearer now. Appropriate changes are made in APN2 370. The TEID3 replaces the TEID2 in the dummy bearer context. Specifically, the UE 110 sends RRM reporting to the macro cell 140. The macro cell 140 communicates with the metro cell 150, and the metro cell 150 communicates with the APN2. The end result of these communications is indicated as follows. In block 455, the TEID1 is active for the default bearer and the TEID2 for the dummy bearer is removed. In block 460, the metro cell 150 now has TEID3 for the dummy bearer. In block 465, the TEID3 replaces TEID in the dummy bearer context.

At the SeNB 150, the Bearer2 is assigned a new TEID=TEID3. The MPTCP proxy 430 autodetects the TEID3 associated with the dummy bearer that has moved to the SeNB as described in STEP H (see also the description of STEP D above). Thus, the MPTCP proxy 430 is able to open two TCP subflows (one to the macro cell 140, one to the metro cell 150). Thereafter, the MPTCP proxy 430 will encapsulate the TCP subflow into the proper GTP tunnel TEID3.

The second TEID discovery procedure in STEP H is triggered by STEP G, where the MPTCP proxy 430 detects no ack (acknowledgement) from sub-flow IP2 (TEID2). See reference 467. Note that there may be a time period associated with this, e.g., such that no acks received within a time period would trigger STEP H actions. In response, as described above, in STEP H, a TEID discovery procedure is started. A special UDP message with dest_ip=IP2 (destination IP address is IP2) is sent. When the packet returns to the MPTCP proxy 420, the packet is embedded into GTP with TEID3. A new tunnel ID for IP2 is known at this juncture. As also indicated, the IP1, IP2, TEID1, and TEID3 are known.

The special UDP message is labeled this way because of the following. The MPTCP proxy 430 sends the message to IP2, and the message will go to the network over APN1 and will be returned (routed) back over APN2. In this case, the PGW (APN2) will send the message to the SeNB ip-addr and place the TEID-SeNB into the GTP header. As APN2 is used for the "dummy" bearer, it means classification rules at APN2 are configured in a way the DL packet does not match the rules. These rules should however process the packet sent by the MPTCP proxy 430 for TEID discovery. So, "special" refers to that it is the packet for which APN2 is configured to be passed over APN2 tunnels. For example, all packets with src_addr=APN subnet would match APN2 rules.

When traffic arrives at the MPTCP proxy over MeNB S1 U (default bearer), the MPTCP proxy sends packets toward two TEIDs (TEID1, TEID3) over two TCP legs, one over the MeNB and one over the SeNB. Thus, MPTCP splits packets of a traffic flow, or the flows themselves over two TEIDs. At this point two TCP subflows (subflow1 and subflow2) will go over two legs Macro and metro.

In STEP 1, the TCP subflow (IP2) goes to tunnel TEID3 (tunnel 470, corresponding to the dummy bearer) owned by m-RRM 320, and the TCP subflow (IP1) goes to the tunnel TEID1 (tunnel 440, corresponding to the default bearer) owned by M-RRM 310. Subflow1 and subflow2 therefore go over to the macro cell 140 and micro cell 150, respectively.

With this approach, aggregation is done on the upper layer higher than PDCP with better intelligence (compared to DC-3C) and with the ability to bring in policy decisions to guide the splitting of traffic.

Figure 5:
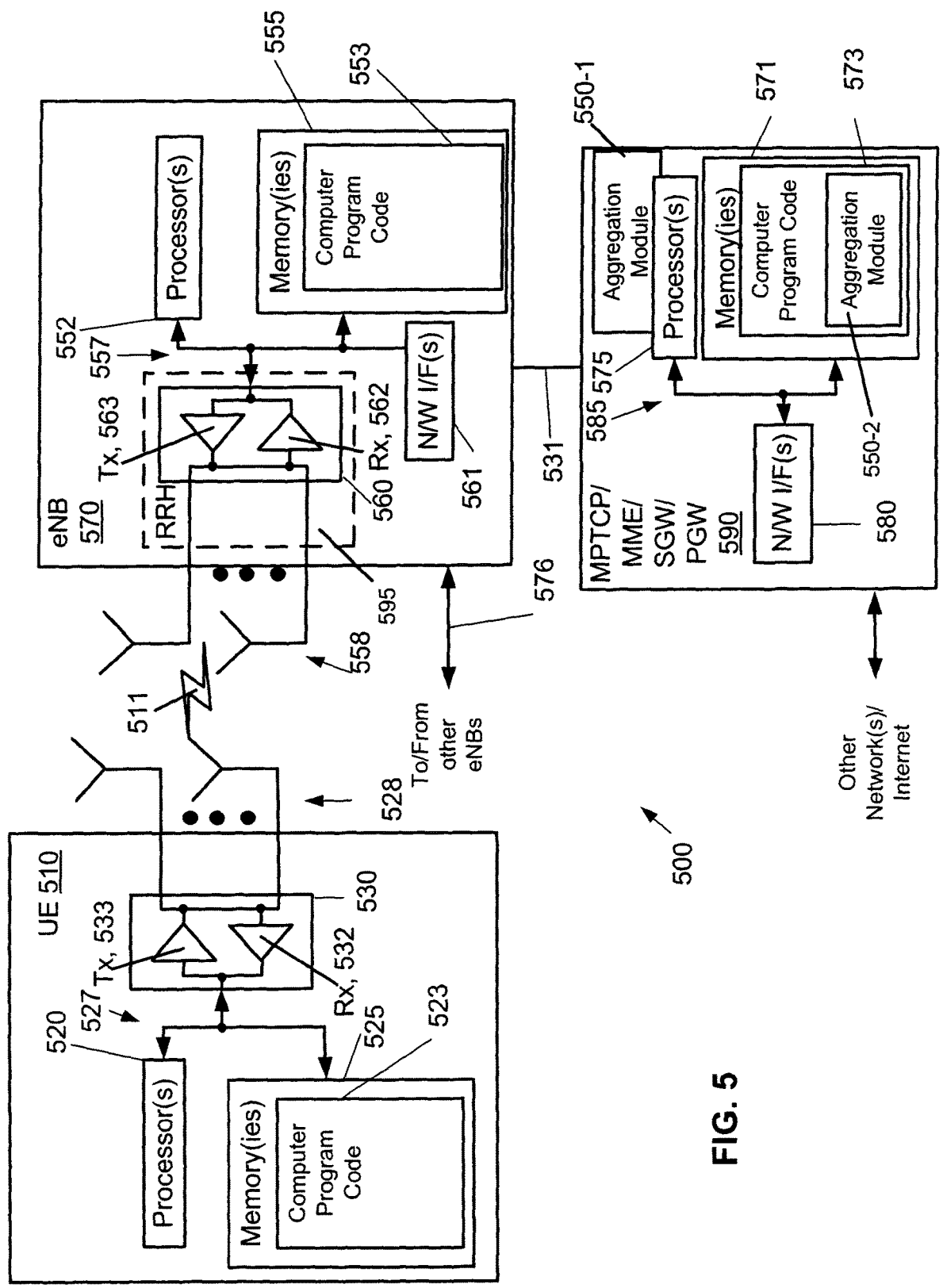
FIG. 5 is a block diagram of another possible and non-limiting exemplary system in which the exemplary embodiments may be practiced.

Turning to FIG. 5, this figure is a block diagram of one possible and non-limiting exemplary system in which the exemplary embodiments may be practiced. In FIG. 5, a user equipment (UE) 110 is in wireless communication with a wireless network 500. Network 500 is one view of the network 100. A UE 110 is a wireless, typically mobile device that can access a wireless network. The UE 110 includes one or more processors 520, one or more memories 525, and one or more transceivers 530 interconnected through one or more buses 527. Each of the one or more transceivers 530 includes a receiver, Rx, 532 and a transmitter, Tx, 533. The one or more buses 527 may be address, data, or control buses, and may include any interconnection mechanism, such as a series of lines on a motherboard or integrated circuit, fiber optics or other optical communication equipment, and the like. The one or more transceivers 530 are connected to one or more antennas 528. The one or more memories 525 include computer program code 523. The one or more memories 525 and the computer program code 523 may be configured to, with the one or more processors 520, cause the user equipment 510 to perform one or more of the operations as described herein. The UE 110 communicates with eNB 570 via a wireless link 511.

The eNB (evolved NodeB) 570 (such as one of the MeNB 140 or SeNB 150) is a base station (e.g., for LTE, long term evolution) that provides access by wireless devices such as the UE 110 to the wireless network 500. The eNB 570 includes one or more processors 552, one or more memories 555, one or more network interfaces (N/W I/F(s)) 561, and one or more transceivers 560 interconnected through one or more buses 557. Each of the one or more transceivers 560 includes a receiver, Rx, 562 and a transmitter, Tx, 563. The one or more transceivers 560 are connected to one or more antennas 558. The one or more memories 555 include computer program code 553. The one or more memories 555 and the computer program code 553 are configured to, with the one or more processors 552, cause the eNB 570 to perform one or more of the operations as described herein. The one or more network interfaces 561 communicate over a network such as via the links 576 and 531. Two or more eNBs 570 communicate using, e.g., link 576. The link 576 may be wired or wireless or both and may implement, e.g., an X2 interface.

The one or more buses 557 may be address, data, or control buses, and may include any interconnection mechanism, such as a series of lines on a motherboard or integrated circuit, fiber optics or other optical communication equipment, wireless channels, and the like. For example, the one or more transceivers 560 may be implemented as a remote radio head (RRH) 195, with the other elements of the eNB 570 being physically in a different location from the RRH, and the one or more buses 557 could be implemented in part as fiber optic cable to connect the other elements of the eNB 570 to the RRH 595.

The wireless network 500 includes a number of additional entities, represented by element 590. The element 590 is used to represent multiple other elements. In one example, the element 590 is the MPTCP proxy 430. In other examples, the element 590 is one of the MME 350, SGW 230, or PGW 220. Depending on which element is being described, the element may provide connectivity with a further network, such as a telephone network and/or a data communications network (e.g., the Internet). The eNB 570 may be coupled via a link 531 to the element 590. The link 531 may be implemented as, e.g., an S1 or other appropriate interface. The element 590 includes one or more processors 575, one or more memories 571, and one or more network interfaces (N/W I/F(s)) 580, interconnected through one or more buses 585. The one or more memories 571 include computer program code 573. The one or more memories 571 and the computer program code 573 are configured to, with the one or more processors 575, cause the NCE 590 to perform one or more operations.

In the example of the element 590 being the MPTCP proxy 430, the MPTCP proxy 430/590 includes an aggregation module 550, comprising one of or both parts 550-1 and/or 550-2, which may be implemented in a number of ways. The aggregation module 550 may be implemented in hardware as aggregation module 550-1, such as being implemented as part of the one or more processors 575. The aggregation module 550-1 may be implemented also as an integrated circuit or through other hardware such as a programmable gate array. In another example, the aggregation module 550 may be implemented as aggregation module 550-2, which is implemented as computer program code 573 and is executed by the one or more processors 575.

In the example of the element 590 being one of the MME 350, SGW 230, or PGW 220, the aggregation module 550 would not be used, but those devices would have other programming or hardware to carry out the functions described herein.

The wireless network 500 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 552 or 575 and memories 555 and 571, and also such virtualized entities create technical effects. The CloudRAN SU 115 in FIG. 1 is one possible entity that may be formed by network virtualization.

The computer readable memories 525, 555, and 571 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 525, 555, and 571 may be means for performing storage functions. The processors 520, 552, and 575 may be of any type suitable to the local technical environment, and may include one or more of general purpose computers, special purpose computers, microprocessors, digital signal processors (DSPs) and processors based on a multi-core processor architecture, as non-limiting examples. The processors 520, 552, and 575 may be means for performing functions, such as controlling the UE 110, eNB 570, and element 590, and for performing other functions as described herein.

Figure 6:
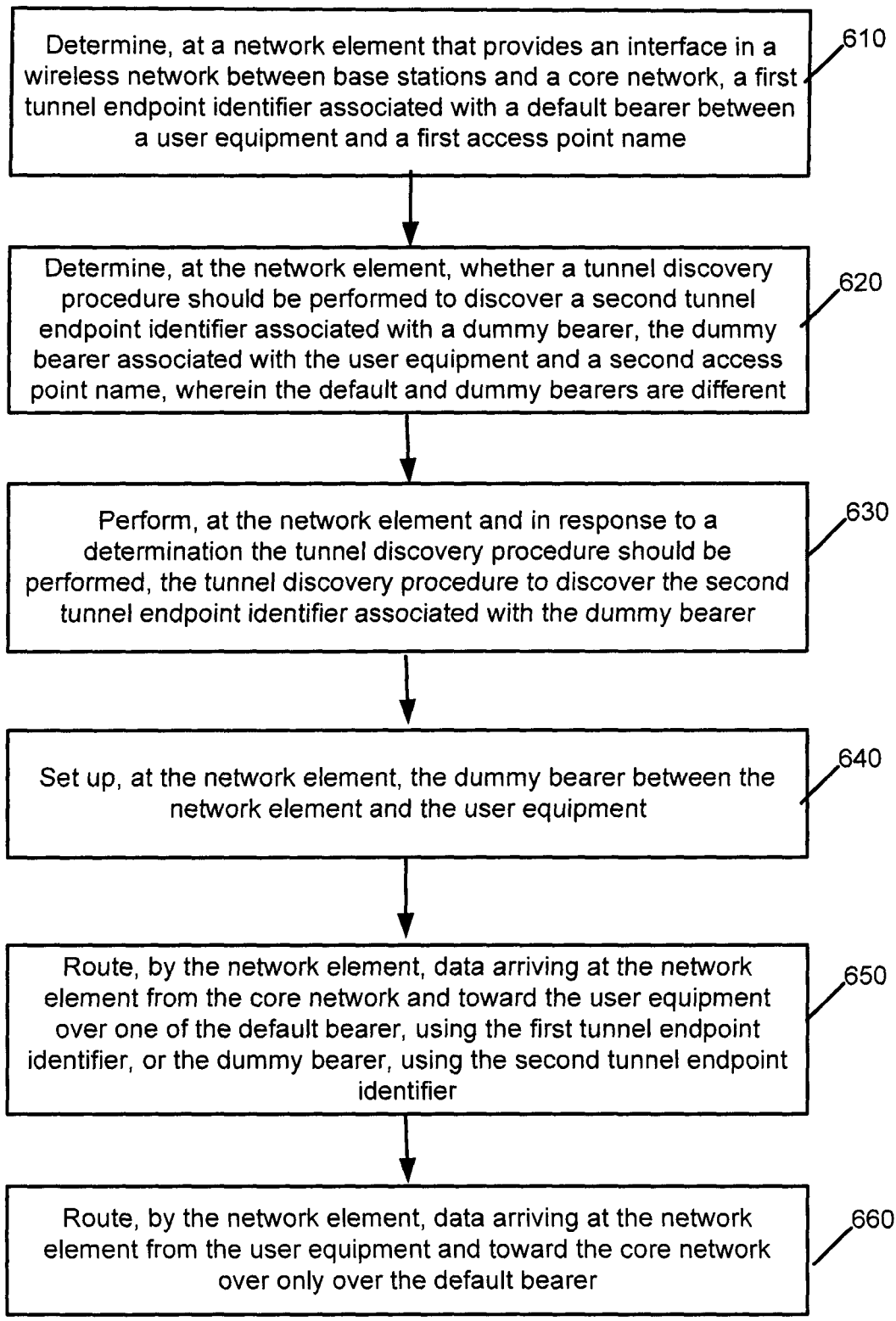
FIG. 6 is a logic flow diagram for multiple air interface aggregation supporting multivendor 4G/5G networks, and illustrates the operation of an exemplary method or methods, a result of execution of computer program instructions embodied on a computer readable memory, functions performed by logic implemented in hardware, and/or interconnected means for performing functions in accordance with exemplary embodiments.

Turning to FIG. 6, a logic flow diagram is shown for multiple air interface aggregation supporting multivendor 4G/5G networks. FIG. 6 illustrates the operation of an exemplary method or methods, a result of execution of computer program instructions embodied on a computer readable memory, functions performed by logic implemented in hardware, and/or interconnected means for performing functions in accordance with exemplary embodiments. It is assumed the blocks of FIG. 6 are performed by a network element, such as the MPTCP proxy 430, under control of the aggregation module 550. However, other network elements are also possible.

The network element provides an interface in a wireless network between base stations and a core network. In block 610, the network element determines a first tunnel endpoint identifier associated with a default bearer between a user equipment and a first access point name. In block 620, the network element determines whether a tunnel discovery procedure should be performed to discover a second tunnel endpoint identifier associated with a dummy bearer. The dummy bearer is associated with the user equipment and a second access point name, and the default and dummy bearers are different.

In block 630, the network element performs, in response to a determination the tunnel discovery procedure should be performed, the tunnel discovery procedure to discover the second tunnel endpoint identifier associated with the dummy bearer. The network element in block 640 sets up the dummy bearer between the network element and the user equipment. The network element in block 650 routes data arriving at the network element from the core network and toward the user equipment over one of the default bearer, using the first tunnel endpoint identifier, or the dummy bearer, using the second tunnel endpoint identifier. In block 660, the network element routes data arriving at the network element from the user equipment and toward the core network over only over the default bearer.

It is noted that all data sent toward the UE from the network (e.g., the core network, EPC), are sent to ip_addr=ip1 and when the data arrives to PGW (e.g., APN), the PGW sends the data over the tunnel with MeNB_ip-addr and TEID1. The MPTCP proxy 430 intercepts the tunnel, takes a packet with information {MeNB-ip, TEID1}{ip1, tcp} and makes a decision which tunnel towards the UE should be used to route the packet. If the decision is to route the packet to tcp_sub-flow1, the MPTCP proxy 430 sends the packet to {MeNB-ip,TEID1}{ip1, tcp} over the default bearer. If the decision is to route the packet to tcp_sub-flow2, the MPTCP proxy 430 forms the packet: {SeNB_ip, TEID2}{ip2, tcp} to route the user tcp packet over the dummy bearer.

That is, the MPTCP proxy 430 makes a routing decision and substitutes {eNB-ip; TEID}{UE_ip} in the source packet based on this decision.

Note that the above example was for use of both MeNB and SeNB. When both the default and dummy bearers are associated with only the MeNB, then if the decision is to route the packet to tcp_sub-flow2, the MPTCP proxy 430 forms the packet: {MeNB_ip, TEID2}{ip2, tcp} to route the user tcp packet over the dummy bearer.

The example in FIG. 6 is referred to as example 1 in the following examples.

Example 2

The method of example 1, wherein:
the default bearer is associated with a first Internet protocol address assigned to the user equipment;
the determining whether a tunnel discovery procedure should be performed to discover a second tunnel endpoint identifier associated with a dummy bearer determines the tunnel discovery procedure should be performed in response to a request by the user equipment to add a subflow corresponding to a second Internet protocol address assigned to the user equipment; and
the method further comprises associating the second Internet protocol address with the dummy bearer.

Example 3

The method of any one of examples 1 to 2, wherein:
the routing data arriving at the network element from the core network and toward the user equipment over one of the default bearer or the dummy bearer routes data over the default bearer to a single base station and routes data over the dummy bearer to the single base station.

Example 4

The method of example 3, wherein the base station is a macro base station.

Example 5

The method of any one of examples 1 to 4, wherein:
the data arriving at the network element from the core network and toward the user equipment has a first Internet protocol address that is assigned to the user equipment and is associated with the default bearer;
a second Internet protocol address is assigned to the user equipment and is associated with the dummy bearer;
the method further comprises the network element making a routing decision whether to route the data over the default bearer or over the dummy bearer;
the routing the data arriving at the network element from the core network and toward the user equipment over one of the default bearer or the dummy bearer is performed responsive to the routing decision;

the network element addresses the data routed over the default bearer to the user equipment using at least an Internet protocol address assigned to a single base station, the first tunnel endpoint identifier, and the first Internet protocol address; and
the network element addresses the data routed over the default bearer to the user equipment using at least an Internet protocol address assigned to the single base station, the second tunnel endpoint identifier, and the second Internet protocol address.

Example 6

The method of example 1, wherein:
the default bearer is associated with a first Internet protocol address assigned to the user equipment;
prior to the determining whether the tunnel discovery procedure should be performed, data between the user equipment and the network element were being routed using an original tunnel endpoint identifier, over the default bearer to and from the core network, and over an original dummy bearer to and from the network element, wherein the original dummy bearer is different from the default bearer and the dummy bearer and wherein the original bearer is associated with a second Internet protocol address assigned to the user equipment;
the method further comprises, prior to the determining whether the tunnel discovery procedure should be performed, determining no transmission control protocol acknowledgements have been received from the second Internet protocol address;
the determining whether a tunnel discovery procedure should be performed to discover a second tunnel endpoint identifier associated with a dummy bearer determines the tunnel discovery procedure should be performed in response to a determination no transmission control protocol acknowledgements have been received from the second Internet protocol address; and
the performing the tunnel discovery procedure is performed to discover the second tunnel endpoint identifier associated with the dummy bearer and associates the discovered second tunnel endpoint identifier with the dummy bearer; and
the method comprises associating the dummy bearer the second Internet protocol address assigned to the user equipment.

Example 7

The method of any one of examples 6, wherein:
the routing data arriving at the network element from the core network and toward the user equipment over one of the default bearer or the dummy bearer routes data over the default bearer to a first base station and routes data over the dummy bearer to a second base station.

Example 8

The method of example 7, wherein the first base station is a macro base station and the second base station is a metro base station.

Example 9

The method of any one of examples 6 to 8, wherein:
the data arriving at the network element from the core network and toward the user equipment has a first Internet protocol address that is assigned to the user equipment and is associated with the default bearer, and the default bearer is associated with a first base station;

a second Internet protocol address is assigned to the user equipment and is associated with the dummy bearer, and the dummy bearer is associated with a second base station;

the method further comprises the network element making a routing decision whether to route the data over the default bearer or over the dummy bearer;

the routing the data arriving at the network element from the core network and toward the user equipment over one of the default bearer or the dummy bearer is performed responsive to the routing decision;

the network element addresses the data routed over the default bearer to the user equipment using at least an Internet protocol address assigned to the first base station, the first tunnel endpoint identifier, and the first Internet protocol address; and the network element addresses the data routed over the default bearer to the user equipment using at least an Internet protocol address assigned to the second base station, the second tunnel endpoint identifier, and the second Internet protocol address.

Example 10

The method of any one of examples 1 to 8, wherein:
the default bearer is associated with a first Internet protocol address assigned to the user equipment;
the dummy bearer is associated with a second Internet protocol address assigned to the user equipment;
the tunnel discovery procedure comprises:
sending a message toward the core network, the message indicating the second Internet protocol address and a port address that is unique to the dummy bearer; and
receiving a response from the core network, the response indicating the second tunnel endpoint identifier.

Example 11

The method of example 10, wherein the message sent toward the core network comprises a user datagram protocol message.

Example 12

The method of any one of examples 1 to 11, wherein the network element comprises a multipath transmission control proxy.

Example 13

An apparatus comprising;
means for determining, at a network element that provides an interface in a wireless network between base stations and a core network, a first tunnel endpoint identifier associated with a default bearer between a user equipment and a first access point name;
means for determining, at the network element, whether a tunnel discovery procedure should be performed to discover a second tunnel endpoint identifier associated with a dummy bearer, the dummy bearer associated with the user equipment and a second access point name, wherein the default and dummy bearers are different;
means for performing, at the network element and in response to a determination the tunnel discovery procedure should be performed, the tunnel discovery procedure to discover the second tunnel endpoint identifier associated with the dummy bearer;

means for setting up, at the network element, the dummy bearer between the network element and the user equipment;

means for routing, by the network element, data arriving at the network element from the core network and toward the user equipment over one of the default bearer, using the first tunnel endpoint identifier, or the dummy bearer, using the second tunnel endpoint identifier; and means for routing, by the network element, data arriving at the network element from the user equipment and toward the core network over only over the default bearer.

Example 14

The apparatus of example 13, wherein:
the default bearer is associated with a first Internet protocol address assigned to the user equipment;
the means for determining whether a tunnel discovery procedure should be performed to discover a second tunnel endpoint identifier associated with a dummy bearer comprises a means for determining the tunnel discovery procedure should be performed in response to a request by the user equipment to add a subflow corresponding to a second Internet protocol address assigned to the user equipment; and
the apparatus further comprises means for associating the second Internet protocol address with the dummy bearer.

Example 15

The apparatus of any one of examples 13 to 14, wherein:
the means for routing data arriving at the network element from the core network and toward the user equipment over one of the default bearer or the dummy bearer comprises means for routing data over the default bearer to a single base station and means for routing data over the dummy bearer to the single base station.

Example 16

The apparatus of example 15, wherein the base station is a macro base station.

Example 17

The apparatus of any one of examples 13 to 16, wherein:
the data arriving at the network element from the core network and toward the user equipment has a first Internet protocol address that is assigned to the user equipment and is associated with the default bearer;
a second Internet protocol address is assigned to the user equipment and is associated with the dummy bearer;
the apparatus further comprises, in the network element, means for making a routing decision whether to route the data over the default bearer or over the dummy bearer;
the means for routing the data arriving at the network element from the core network and toward the user equipment over one of the default bearer or the dummy bearer is responsive to the routing decision;
the apparatus comprises, in the network element, means for addressing the data routed over the default bearer to the user equipment using at least an Internet protocol address assigned to a single base station, the first tunnel endpoint identifier, and the first Internet protocol address; and the apparatus comprises, in the network element, means for addressing the data routed over the default bearer to the user equipment using at least an Internet protocol address assigned to the single base station, the second tunnel endpoint identifier, and the second Internet protocol address.

Example 18

The apparatus of example 13, wherein:

the default bearer is associated with a first Internet protocol address assigned to the user equipment;

prior to the determining whether the tunnel discovery procedure should be performed, data between the user equipment and the network element were being routed using an original tunnel endpoint identifier, over the default bearer to and from the core network, and over an original dummy bearer to and from the network element, wherein the original dummy bearer is different from the default bearer and the dummy bearer and wherein the original bearer is associated with a second Internet protocol address assigned to the user equipment;

the apparatus further comprises means, performed prior to the determining whether the tunnel discovery procedure should be performed, for determining no transmission control protocol acknowledgements have been received from the second Internet protocol address;

the means for determining whether a tunnel discovery procedure should be performed to discover a second tunnel endpoint identifier associated with a dummy bearer comprises means for determining the tunnel discovery procedure should be performed in response to a determination no transmission control protocol acknowledgements have been received from the second Internet protocol address; and the means for performing the tunnel discovery procedure is performed to discover the second tunnel endpoint identifier associated with the dummy bearer and associates the discovered second tunnel endpoint identifier with the dummy bearer; and the apparatus comprises means for associating the dummy bearer the second Internet protocol address assigned to the user equipment.

Example 19

The apparatus of example 18, wherein:

the means for routing data arriving at the network element from the core network and toward the user equipment over one of the default bearer or the dummy bearer comprises means for routing data over the default bearer to a first base station and means for routing data over the dummy bearer to a second base station.

Example 20

The apparatus of example 19, wherein the first base station is a macro base station and the second base station is a metro base station.

Example 21

The apparatus of any one of examples 18 to 20, wherein:

the data arriving at the network element from the core network and toward the user equipment has a first Internet protocol address that is assigned to the user equipment and is associated with the default bearer, and the default bearer is associated with a first base station;

a second Internet protocol address is assigned to the user equipment and is associated with the dummy bearer, and the dummy bearer is associated with a second base station;

the apparatus further comprises means, in the network element, for making a routing decision whether to route the data over the default bearer or over the dummy bearer;

the means for routing the data arriving at the network element from the core network and toward the user equipment over one of the default bearer or the dummy bearer is performed responsive to the routing decision;

the apparatus comprises, in the network element, means for addressing the data routed over the default bearer to the user equipment using at least an Internet protocol address assigned to the first base station, the first tunnel endpoint identifier, and the first Internet protocol address; and the apparatus comprises, in the network element, means for addressing the data routed over the default bearer to the user equipment using at least an Internet protocol address assigned to the second base station, the second tunnel endpoint identifier, and the second Internet protocol address.

Example 22

The apparatus of any one of examples 13 to 21, wherein:

the default bearer is associated with a first Internet protocol address assigned to the user equipment;

the dummy bearer is associated with a second Internet protocol address assigned to the user equipment;

the tunnel discovery procedure comprises:

means for sending a message toward the core network, the message indicating the second Internet protocol address and a port address that is unique to the dummy bearer; and means for receiving a response from the core network, the response indicating the second tunnel endpoint identifier.

Example 23

The apparatus of example 22, wherein the message sent toward the core network comprises a user datagram protocol message.

Example 24

The apparatus of any one of examples 13 to 24, wherein the network element comprises a multipath transmission control proxy.

Example 25

A communication system comprising any one of examples 13 to 24.

Example 26

An apparatus comprising:

one or more processors; and one or more memories including computer program code, the one or more memories and the computer program code configured, with the one or more processors, to cause the apparatus to perform at least the following:

determining, at a network element that provides an interface in a wireless network between base stations and a core network, a first tunnel endpoint identifier associated with a default bearer between a user equipment and a first access point name;

determining, at the network element, whether a tunnel discovery procedure should be performed to discover a second tunnel endpoint identifier associated with a dummy bearer, the dummy bearer associated with the user equipment and a second access point name, wherein the default and dummy bearers are different;

performing, at the network element and in response to a determination the tunnel discovery procedure should be performed, the tunnel discovery procedure to discover the second tunnel endpoint identifier associated with the dummy bearer;

setting up, at the network element, the dummy bearer between the network element and the user equipment;

routing, by the network element, data arriving at the network element from the core network and toward the user equipment over one of the default bearer, using the first tunnel endpoint identifier, or the dummy bearer, using the second tunnel endpoint identifier; and routing, by the network element, data arriving at the network element from the user equipment and toward the core network over only over the default bearer.

Example 27

The apparatus of example 26, wherein the one or more memories and the computer program code are configured, with the one or more processors, to cause the apparatus to perform any one of the methods in examples 2 to 12.

Example 28

A computer program comprising program code for executing the method according to any of examples 1 to 12.

Example 29

The computer program according to example 28, wherein the computer program is a computer program product comprising a computer-readable medium bearing computer program code embodied therein for use with a computer.

Without in any way limiting the scope, interpretation, or application of the claims appearing below, a technical effect of one or more of the example embodiments disclosed herein is the ability to add metro cells from one vendor to areas controlled by macro cells controlled by another vendor. Another technical effect of one or more of the example embodiments disclosed herein is an improvement in overall system capacity, such that the over system capacity may be improved. Another technical effect of one or more of the example embodiments disclosed herein is providing maximal HetNet capacity with a metro overlay solution with no assistance from the macro eNB.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 5. A computer-readable medium may comprise a computer-readable storage medium (e.g., memories 525, 555, 571 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP third generation partnership project
4G fourth generation
5G fifth generation
AF application function
AP access point
APN access point name
CA carrier aggregation
DC dual connectivity
DL downlink (from base station to user equipment)
EPC evolved packet core
eNB (or eNodeB) evolved Node B (e.g., an LTE base station)
E-RAB E-UTRAN radio access bearer, which is the concatenation of an S1 bearer and the corresponding radio bearer
E-UTRAN evolved universal terrestrial radio access network
FEU front-end unit
GBR guaranteed bit rate
GHz giga-Hertz
GPRS general packet radio service
gNB base station for 5G/New Radio
GTP GPRS Tunneling Protocol
HetNet heterogeneous network
HN-LM HetNet load manager
ID identification
IETF internet engineering task force
I/F interface
IMS Internet protocol multimedia subsystem
IP Internet protocol
IP-addr IP address
LAA license assisted access
LTE long term evolution
LTE-U LTE unlicensed
LWA LTE Wi-Fi Aggregation
MCG master cell group
MeNB macro eNB
MME mobility management entity
mmW millimeter wave
MPTCP multipath TCP
MulteFire an LTE-based technology for small cells operating solely in unlicensed spectrum (also: MuLTEfire)
NCE network control element
NR new radio
N/W network OFDM orthogonal frequency division multiplexing
PCC policy charging control
PDCP packet data convergence protocol
PDN packet data network
PGW packet gateway (or packet data network gateway)
QoS quality of service
RAB radio access bearer
RAN radio access network
RAT radio access technology
RFC request for comments
RRH remote radio head
RRM radio resource management
RTP real-time transport protocol
Rx receiver
SCG secondary cell group
SeNB secondary eNB
SGW serving gateway
SU server unit
TCP transmission control protocol
TEID tunnel endpoint identifier (also referred to as a tunneling end identity), which uniquely identifies a tunnel endpoint
TFT traffic flow template
Tr-Swi traffic switch
Tx transmitter
UDP user datagram protocol
UE user equipment (e.g., a wireless, typically mobile device)
UL uplink (from user equipment to base station)
VoLTE voice over LTE
WiFi or Wi-Fi wireless fidelity, a wireless networking protocol that allows devices to communicate

What is claimed is:

1. A method, comprising:
determining, at a network element that provides an interface in a wireless network between base stations and a core network, a first tunnel endpoint identifier associated with a default bearer between a user equipment and a first access point name;
determining, at the network element, whether a tunnel discovery procedure should be performed to discover a second tunnel endpoint identifier associated with a dummy bearer, the dummy bearer associated with the user equipment and a second access point name, wherein the first tunnel endpoint identifier associated with the default bearer and the second tunnel endpoint identifier associated with the dummy bearer each use a different tunnel endpoint identifier;
performing, at the network element and in response to a determination the tunnel discovery procedure should be performed, the tunnel discovery procedure to discover the second tunnel endpoint identifier associated with the dummy bearer;
setting up, at the network element, the dummy bearer between the network element and the user equipment;
routing, by the network element, data arriving at the network element from the core network and toward the user equipment over one of the default bearer using the first tunnel endpoint identifier, or the dummy bearer using the second tunnel endpoint identifier; and
routing, by the network element, data arriving at the network element from the user equipment and toward the core network over only over the default bearer.

2. The method of claim 1, wherein:
the default bearer is associated with a first Internet protocol address assigned to the user equipment;
the determining whether a tunnel discovery procedure should be performed to discover a second tunnel endpoint identifier associated with a dummy bearer determines the tunnel discovery procedure should be performed in response to a request by the user equipment to add a subflow corresponding to a second Internet protocol address assigned to the user equipment; and
the method further comprises associating the second Internet protocol address with the dummy bearer.

3. The method of claim 1, wherein:
the routing data arriving at the network element from the core network and toward the user equipment over one of the default bearer or the dummy bearer routes data over the default bearer to a single base station and routes data over the dummy bearer to the single base station.

4. The method of claim 3, wherein the base station is a macro base station.

5. The method of claim 1 wherein:
the data arriving at the network element from the core network and toward the user equipment has a first Internet protocol address that is assigned to the user equipment and is associated with the default bearer;
a second Internet protocol address is assigned to the user equipment and is associated with the dummy bearer;
the method further comprises the network element making a routing decision whether to route the data over the default bearer or over the dummy bearer;
the routing the data arriving at the network element from the core network and toward the user equipment over one of the default bearer or the dummy bearer is performed responsive to the routing decision;
the network element addresses the data routed over the default bearer to the user equipment using at least an Internet protocol address assigned to a single base station, the first tunnel endpoint identifier, and the first Internet protocol address; and
the network element addresses the data routed over the default bearer to the user equipment using at least an Internet protocol address assigned to the single base station, the second tunnel endpoint identifier, and the second Internet protocol address.

6. The method of claim 1, wherein:
the default bearer is associated with a first Internet protocol address assigned to the user equipment;
prior to the determining whether the tunnel discovery procedure should be performed, data between the user equipment and the network element were being routed using an original tunnel endpoint identifier, over the default bearer to and from the core network, and over an original dummy bearer to and from the network element, wherein the original dummy bearer is different from the default bearer and the dummy bearer and wherein the original bearer is associated with a second Internet protocol address assigned to the user equipment;
the method further comprises, prior to the determining whether the tunnel discovery procedure should be performed, determining no transmission control protocol acknowledgements have been received from the second Internet protocol address;
the determining whether a tunnel discovery procedure should be performed to discover a second tunnel endpoint identifier associated with a dummy bearer determines the tunnel discovery procedure should be performed in response to a determination no transmission control protocol acknowledgements have been received from the second Internet protocol address; and the performing the tunnel discovery procedure is performed to discover the second tunnel endpoint identifier associated with the dummy bearer and associates the discovered second tunnel endpoint identifier with the dummy bearer; and the method comprises associating the dummy bearer the second Internet protocol address assigned to the user equipment.

7. The method of claim 6, wherein:
the routing data arriving at the network element from the core network and toward the user equipment over one of the default bearer or the dummy bearer routes data over the default bearer to a first base station and routes data over the dummy bearer to a second base station, wherein the first base station is a macro base station and the second base station is a metro base station.

8. The method of claim 6, wherein:
the data arriving at the network element from the core network and toward the user equipment has a first Internet protocol address that is assigned to the user equipment and is associated with the default bearer, and the default bearer is associated with a first base station;
a second Internet protocol address is assigned to the user equipment and is associated with the dummy bearer, and the dummy bearer is associated with a second base station;
the method further comprises the network element making a routing decision whether to route the data over the default bearer or over the dummy bearer;
the routing the data arriving at the network element from the core network and toward the user equipment over one of the default bearer or the dummy bearer is performed responsive to the routing decision;
the network element addresses the data routed over the default bearer to the user equipment using at least an Internet protocol address assigned to the first base station, the first tunnel endpoint identifier, and the first Internet protocol address; and
the network element addresses the data routed over the default bearer to the user equipment using at least an Internet protocol address assigned to the second base station, the second tunnel endpoint identifier, and the second Internet protocol address.

9. The method of claim 1, wherein:
the default bearer is associated with a first Internet protocol address assigned to the user equipment;
the dummy bearer is associated with a second Internet protocol address assigned to the user equipment;
the tunnel discovery procedure comprises:
sending a message toward the core network, the message indicating the second Internet protocol address and a port address that is unique to the dummy bearer; and
receiving a response from the core network, the response indicating the second tunnel endpoint identifier, wherein the message sent toward the core network comprises a user datagram protocol message.

10. The method of claim 1, wherein the network element comprises a multipath transmission control proxy.

11. An apparatus comprising;
circuitry configured to determine, at a network element that provides an interface in a wireless network between base stations and a core network, a first tunnel endpoint identifier associated with a default bearer between a user equipment and a first access point name;
circuitry configured to determine, at the network element, whether a tunnel discovery procedure should be performed to discover a second tunnel endpoint identifier associated with a dummy bearer, the dummy bearer associated with the user equipment and a second access point name, wherein the first tunnel endpoint identifier associated with the default bearer and the second tunnel endpoint identifier associated with the dummy bearer each use a different tunnel endpoint identifier;
circuitry configured to perform, at the network element and in response to a determination the tunnel discovery procedure should be performed, the tunnel discovery procedure to discover the second tunnel endpoint identifier associated with the dummy bearer;
circuitry configured to set up, at the network element, the dummy bearer between the network element and the user equipment;
circuitry configured to route, by the network element, data arriving at the network element from the core network and toward the user equipment over one of the default bearer using the first tunnel endpoint identifier, or the dummy bearer using the second tunnel endpoint identifier; and
circuitry configured to route, by the network element, data arriving at the network element from the user equipment and toward the core network over only over the default bearer.

12. The apparatus of claim 11, wherein:
the default bearer is associated with a first Internet protocol address assigned to the user equipment;
the circuitry configured to determine whether a tunnel discovery procedure should be performed to discover a second tunnel endpoint identifier associated with a dummy bearer comprises circuitry configured to determine the tunnel discovery procedure should be performed in response to a request by the user equipment to add a subflow corresponding to a second Internet protocol address assigned to the user equipment; and
the apparatus further comprises circuitry configured to associate the second Internet protocol address with the dummy bearer.

13. The apparatus of claim 11, wherein:
the circuitry configured to route data arriving at the network element from the core network and toward the user equipment over one of the default bearer or the dummy bearer comprises circuitry configured to route data over the default bearer to a single base station and circuitry configured to route data over the dummy bearer to the single base station, wherein the base station is a macro base station.

14. The apparatus of claim 11, wherein:
the data arriving at the network element from the core network and toward the user equipment has a first Internet protocol address that is assigned to the user equipment and is associated with the default bearer;
a second Internet protocol address is assigned to the user equipment and is associated with the dummy bearer;
the apparatus further comprises, in the network element, circuitry configured to make a routing decision whether to route the data over the default bearer or over the dummy bearer;
the circuitry configured to route the data arriving at the network element from the core network and toward the user equipment over one of the default bearer or the dummy bearer is responsive to the routing decision;
the apparatus comprises, in the network element, circuitry configured to address the data routed over the default bearer to the user equipment using at least an Internet protocol address assigned to a single base station, the first tunnel endpoint identifier, and the first Internet protocol address; and the apparatus comprises, in the network element, circuitry configured to address the data routed over the default bearer to the user equipment using at least an Internet protocol address assigned to the single base station, the second tunnel endpoint identifier, and the second Internet protocol address.

15. The apparatus of claim 11, wherein:

the default bearer is associated with a first Internet protocol address assigned to the user equipment;

prior to the determining whether the tunnel discovery procedure should be performed, data between the user equipment and the network element were being routed using an original tunnel endpoint identifier, over the default bearer to and from the core network, and over an original dummy bearer to and from the network element, wherein the original dummy bearer is different from the default bearer and the dummy bearer and wherein the original bearer is associated with a second Internet protocol address assigned to the user equipment;

the apparatus further comprises circuitry, performed prior to the determining whether the tunnel discovery procedure should be performed, configured to determine no transmission control protocol acknowledgements have been received from the second Internet protocol address;

the circuitry configured to determine whether a tunnel discovery procedure should be performed to discover a second tunnel endpoint identifier associated with a dummy bearer comprises circuitry configured to determine the tunnel discovery procedure should be performed in response to a determination no transmission control protocol acknowledgements have been received from the second Internet protocol address; and the circuitry configured to perform the tunnel discovery procedure is performed to discover the second tunnel endpoint identifier associated with the dummy bearer and associates the discovered second tunnel endpoint identifier with the dummy bearer; and the apparatus comprises circuitry configured to associate the dummy bearer the second Internet protocol address assigned to the user equipment.

16. The apparatus of claim 15, wherein:

the circuitry configured to route data arriving at the network element from the core network and toward the user equipment over one of the default bearer or the dummy bearer comprises circuitry configured to route data over the default bearer to a first base station and circuitry configured to route data over the dummy bearer to a second base station, wherein the first base station is a macro base station and the second base station is a metro base station.

17. The apparatus of claim 15, wherein:

the data arriving at the network element from the core network and toward the user equipment has a first Internet protocol address that is assigned to the user equipment and is associated with the default bearer, and the default bearer is associated with a first base station;

a second Internet protocol address is assigned to the user equipment and is associated with the dummy bearer, and the dummy bearer is associated with a second base station;

the apparatus further comprises circuitry, in the network element, configured to make a routing decision whether to route the data over the default bearer or over the dummy bearer;

the circuitry configured to route the data arriving at the network element from the core network and toward the user equipment over one of the default bearer or the dummy bearer is performed responsive to the routing decision;

the apparatus comprises, in the network element, circuitry configured to address the data routed over the default bearer to the user equipment using at least an Internet protocol address assigned to the first base station, the first tunnel endpoint identifier, and the first Internet protocol address; and the apparatus comprises, in the network element, circuitry configured to address the data routed over the default bearer to the user equipment using at least an Internet protocol address assigned to the second base station, the second tunnel endpoint identifier, and the second Internet protocol address.

18. The apparatus of claim 11, wherein:

the default bearer is associated with a first Internet protocol address assigned to the user equipment;

the dummy bearer is associated with a second Internet protocol address assigned to the user equipment;

the tunnel discovery procedure comprises:

circuitry configured to send a message toward the core network, the message indicating the second Internet protocol address and a port address that is unique to the dummy bearer; and circuitry configured to receive a response from the core network, the response indicating the second tunnel endpoint identifier, wherein the message sent toward the core network comprises a user datagram protocol message.

19. The apparatus of claim 11, wherein the network element comprises a multipath transmission control proxy.

20. An apparatus comprising:

one or more processors; and one or more memories including computer program code, the one or more memories and the computer program code configured, with the one or more processors, to cause the apparatus to perform at least the following:

determining, at a network element that provides an interface in a wireless network between base stations and a core network, a first tunnel endpoint identifier associated with a default bearer between a user equipment and a first access point name;

determining, at the network element, whether a tunnel discovery procedure should be performed to discover a second tunnel endpoint identifier associated with a dummy bearer, the dummy bearer associated with the user equipment and a second access point name, wherein the first tunnel endpoint identifier associated with the default bearer and the second tunnel endpoint identifier associated with the dummy bearer each use a different tunnel endpoint identifier;

performing, at the network element and in response to a determination the tunnel discovery procedure should be performed, the tunnel discovery procedure to discover the second tunnel endpoint identifier associated with the dummy bearer;

setting up, at the network element, the dummy bearer between the network element and the user equipment;

routing, by the network element, data arriving at the network element from the core network and toward the user equipment over one of the default bearer using the first tunnel endpoint identifier, or the dummy bearer using the second tunnel endpoint identifier; and routing, by the network element, data arriving at the network element from the user equipment and toward the core network over only over the default bearer.

21. The apparatus of claim 20, wherein the one or more memories and the computer program code are configured, with the one or more processors, to cause the apparatus to perform a method comprising:

determining, at a network element that provides an interface in a wireless network between base stations and a core network, a first tunnel endpoint identifier associated with a default bearer between a user equipment and a first access point name;

determining, at the network element, whether a tunnel discovery procedure should be performed to discover a second tunnel endpoint identifier associated with a dummy bearer, the dummy bearer associated with the user equipment and a second access point name, wherein the first tunnel endpoint identifier associated with the default bearer and the second tunnel endpoint identifier associated with the dummy bearer each use a different tunnel endpoint identifier;

performing, at the network element and in response to a determination the tunnel discovery procedure should be performed, the tunnel discovery procedure to discover the second tunnel endpoint identifier associated with the dummy bearer;

setting up, at the network element, the dummy bearer between the network element and the user equipment;

routing, by the network element, data arriving at the network element from the core network and toward the user equipment over one of the default bearer, using the first tunnel endpoint identifier, or the dummy bearer, using the second tunnel endpoint identifier; and routing, by the network element, data arriving at the network element from the user equipment and toward the core network over only over the default bearer and wherein the default bearer is associated with a first Internet protocol address assigned to the user equipment;

the determining whether a tunnel discovery procedure should be performed to discover a second tunnel endpoint identifier associated with a dummy bearer determines the tunnel discovery procedure should be performed in response to a request by the user equipment to add a subflow corresponding to a second Internet protocol address assigned to the user equipment; and the method further comprises associating the second Internet protocol address with the dummy bearer.

* * * * *